US008283411B2

(12) United States Patent
Gosse et al.

(10) Patent No.: US 8,283,411 B2
(45) Date of Patent: *Oct. 9, 2012

(54) PLASTICISED POLYVINYL CHLORIDE

(75) Inventors: Claudius Gosse, Brussels (BE); Thomas Marshall Larson, Bellaire, TX (US); Pierre Jean Paul Legrand, Brussels (BE); Raphael Frans Caers, Edegem (BE); Paul H Daniels, League City, TX (US); Allen D. Godwin, Seabrook, TX (US); Didier Naert, Brussels (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/301,375

(22) Filed: Nov. 21, 2011

(65) Prior Publication Data

US 2012/0071598 A1 Mar. 22, 2012

Related U.S. Application Data

(63) Continuation of application No. 12/909,561, filed on Oct. 21, 2010, now Pat. No. 8,084,534, which is a continuation of application No. 12/511,781, filed on Jul. 29, 2009, now Pat. No. 7,855,340, which is a continuation of application No. 12/172,513, filed on Jul. 14, 2008, now Pat. No. 7,585,571, which is a continuation of application No. 11/846,879, filed on Aug. 29, 2007, now Pat. No. 7,413,813, which is a continuation of application No. 10/490,760, filed as application No. PCT/EP02/10945 on Sep. 25, 2002, now Pat. No. 7,297,738.

(30) Foreign Application Priority Data

| Sep. 25, 2001 | (GB) | .................................. | 0123018.4 |
|---|---|---|---|
| Sep. 25, 2001 | (GB) | .................................. | 0123019.2 |
| Sep. 25, 2001 | (GB) | .................................. | 0123020.0 |
| Sep. 25, 2001 | (GB) | .................................. | 0123021.8 |
| Sep. 25, 2001 | (GB) | .................................. | 0123022.6 |
| Sep. 25, 2001 | (GB) | .................................. | 0123134.9 |
| Sep. 25, 2001 | (GB) | .................................. | 0123221.4 |
| Sep. 25, 2001 | (GB) | .................................. | 0201188.0 |

(51) Int. Cl.
*C08L 27/06* (2006.01)

(52) U.S. Cl. ........................................ 524/569; 524/285

(58) Field of Classification Search .................. 524/285, 524/569

See application file for complete search history.

(56) References Cited

U.S. PATENT DOCUMENTS

| 2,489,103 | A | 11/1949 | Morris et al. |
|---|---|---|---|
| 2,535,643 | A | 12/1950 | Mack |
| 2,849,412 | A | 8/1958 | Robb et al. |
| 3,296,180 | A | 1/1967 | Raether |
| 5,319,028 | A | 6/1994 | Nakamura et al. |
| 6,284,917 | B1 | 9/2001 | Brunner et al. |
| 7,683,204 | B2 | 3/2010 | Büschken et al. |
| 2002/0019559 | A1 | 2/2002 | Brunner et al. |

FOREIGN PATENT DOCUMENTS

| DE | 20021356 | 2/2001 |
|---|---|---|
| EP | 0 010 808 | 6/2003 |
| EP | 1 393 759 | 3/2004 |
| FR | 1 355 586 | 1/1963 |
| JP | 11 309828 | 9/1999 |
| JP | 2001-207002 | 7/2001 |
| WO | 97/39060 | 10/1997 |

OTHER PUBLICATIONS

BASF, "*Phthalate Plasticisers Under Attack Again*", British Plastics and Rubber Online, http://www.polymer-age.co.uk/archive53.htm, Jul. 15, 2002.
BASF, The Chemical Company, Dr. B. Breitscheidel and Dr. Gerhard Krack, GKA Kompetenzzentrum Analytik, "*NMR—Measurement of Hexamoll Dinch*", Feb. 7, 2008.
Hüls, Product Information, Vestinol®, "*Vestinol 9*", 2 pages.
Krauskopf, L.G., "*Plasticizer Structure/Performance Relationships*", Journal of Vinyl Technology, Manchester, NH, US, vol. 15, No. 3, pp. 140-147, 1993.
Kai et al.,"*Polyester Molded Products With Improved Adhesion, Their Manufacture, and Primers Therefor*", Database Accession No. 131:311520 (Chemical Abstract).
Krauskopf, L.G., "*Plasticizer Structure/Performance Relationships*", Journal of Vinyl Technology, Manchester, NH, US, vol. 15, No. 3, pp. 140-147.

*Primary Examiner* — Peter Szekely
(74) *Attorney, Agent, or Firm* — Leandro Arechederra, III

(57) ABSTRACT

Esters of cyclohexane polycarboxylic acids are used as plasticizers for polyvinyl chloride to enable products with comparable mechanical properties to be obtained using less polyvinyl chloride. Use of these esters also produces formulations with increased stability to ultra-violet light, improved low temperature properties, lower viscosity and improved processability as well as reduced smoke on burning. The esters of cyclohexane polycarboxylic acids may be used alone or in admixture with other plasticizers when the esters of cyclohexane polycarboxylic acids may act as viscosity depressants. Fast fusing plasticizers may also be included. The formulations are particularly useful in the production of a range of goods from semi-rigid to highly flexible materials and are particularly useful in the production of medical materials such as blood bags and tubing.

21 Claims, 7 Drawing Sheets

PLASTICISED POLYVINYL CHLORIDE

CROSS REFERENCE TO RELATED APPLICATIONS

This application is a continuation of Ser. No. 12/909,561, filed, Oct. 21, 2010, now U.S. Pat. No. 8,084,534, which is a continuation of Ser. No. 12/511,781, filed Jul. 29, 2009, now U.S. Pat. No. 7,855,340, which is a continuation of Ser. No. 12/172,513, filed Jul. 14, 2008, now U.S. Pat. No. 7,585,571, which is a continuation of Ser. No. 11/846,879, filed Aug. 29, 2007, now U.S. Pat. No. 7,413,813, which is a continuation of Ser. No. 10/490,760, filed Sep. 8, 2004, now U.S. Pat. No. 7,297,738, which is a National Stage Application of International Application No. PCT/EP02/10945, filed 25 Sep. 2002, which claims the benefit of GB 0123018.4 filed 25 Sep. 2001; GB 0123019.2 filed 25 Sep. 2001; GB 0123020.0 filed 25 Sep. 2001; GB 0123021.8 filed 25 Sep. 2001; GB 0123022.6 filed 25 Sep. 2001; GB 0123134.9 filed 26 Sep. 2001; GB 0123221.4 filed 27 Sep. 2001; and GB 0201188.0 filed 21 Jan. 2002, the disclosures of which are fully incorporated herein by reference.

FIELD OF THE INVENTION

The present invention relates to improved polyvinyl chloride compositions. Polyvinyl chloride is widely used in a variety of applications. Polyvinyl chloride is commonly used in a mixture with a plasticiser. The nature of the polyvinyl chloride, the nature of the plasticiser and the proportions of the two materials are chosen to provide a polyvinyl chloride composition having the desired properties for a particular application. Examples of the major uses of plasticised polyvinyl chloride compositions include wire and cable coating, other electrical applications such as plugs, film, foil and sheeting, flooring, wall covering, roofing and membranes. Other uses include films such as stationary films, adhesives tapes and agricultural films. Polyvinyl chloride is also used in medical applications such as blood bags, tubing and bottle caps, further uses include footwear, pipe and guttering and fabric coating.

BACKGROUND OF THE INVENTION

Phthalate esters are widely used as plasticisers for polyvinyl chloride. Examples of phthalate esters that are used include dioctyl phthalate, di-isononyl phthalate, di-isodecyl phthalate, di-isooctly phthalate, diisoheptyl phthalate and di-2ethyl hexyl phthalate (DEHP). Typical commercial materials include the Jayflex plasticisers, Jayflex® DNP and Jayflex®DIDP available from ExxonMobil Chemical and the Palatinol® plasticisers marketed by BASF and Vestinol® from Oxeno.

The alcohols from which the plasticiser esters are made are generally obtained by either olefin oligomerisation followed by hydroformylation or by hydroformylation of olefins to form aldehydes followed by aldehyde dimerization, generally by an aldol reaction. The alkyl groups of the esters therefore vary in size and structure according to the process and raw materials used to produce the alcohols. Typical plasticiser esters contain alkyl groups of 5 to 13 carbon atoms, particularly 7 to 13 carbon atoms, and have varying degrees of branching. The size and structure of the alkyl group helps determine the volatility and gellation temperature of the plasticiser and is therefore chosen according to the application in which the plasticised polyvinyl chloride is to be used. For instance flooring, where stain resistance is required, high volatility, at least of the surface layer, is desired.

There is a constant need to improve the properties of plasticisers to provide polyvinyl chloride compositions having improved properties. There is also a need for alternative plasticisers. In addition there is a need to improve the properties of plasticisers. It has also been proposed that esters of cyclohexane carboxylic acids particularly esters of cyclohexane dicarboxylic acids may be used as plasticisers for polyvinyl chloride. For example United States defensive patent publication T 864003 discloses the use of cyclohexane 1-4 dicarboxylate esters as plasticisers. In particular T 864003 discloses bis(2-ethylhexyl)cyclohexane 1-4 dicarboxylate as a plasticiser and compares its performance with bis(2-ethylhexyl) phthalate and finds improved low temperature performance and comparable mechanical properties when using the cyclohexane based material. Such materials are also described in a Union Carbide Chemicals Company Technical Information bulletin Number F-7893B of November 1957 entitled "Flexol" Plasticiser CC-55.

More recently Gebrauchsmuster DE 29824628 and PCT Publication WO 99/32427 disclose a range of plasticisers based on cyclohexane dicarboxylic acid prepared by the hydrogenation of the corresponding phthalates. According to DE 29824628 and WO 99/32427 the cyclohexanoates have lower density and viscosity and yield an improvement in the low temperature flexibility of the plastics when compared with the corresponding phthalates. Properties such as the Shore hardness and other mechanical properties of the resultant plastics are said to be identical to those obtained with the use of phthalates. According to WO 99/32427 the cyclohexanoates exhibit better workability in a dry blend and also have advantages through the markedly lower viscosity when compared with the corresponding phthalates.

Japanese Patent Application Publication Number P 2001 207002 describes cyclohexane dicarboxylic acid esters derived from mixtures containing from 80 to 97 wt % of $C_9$ branched alcohols. Japanese Patent Publication Number P 2001-207002 compares, as plasticisers, these esters with dioctyl phthalate and finds improved cold resistance, viscosity and viscosity stability over time.

Figure 1:
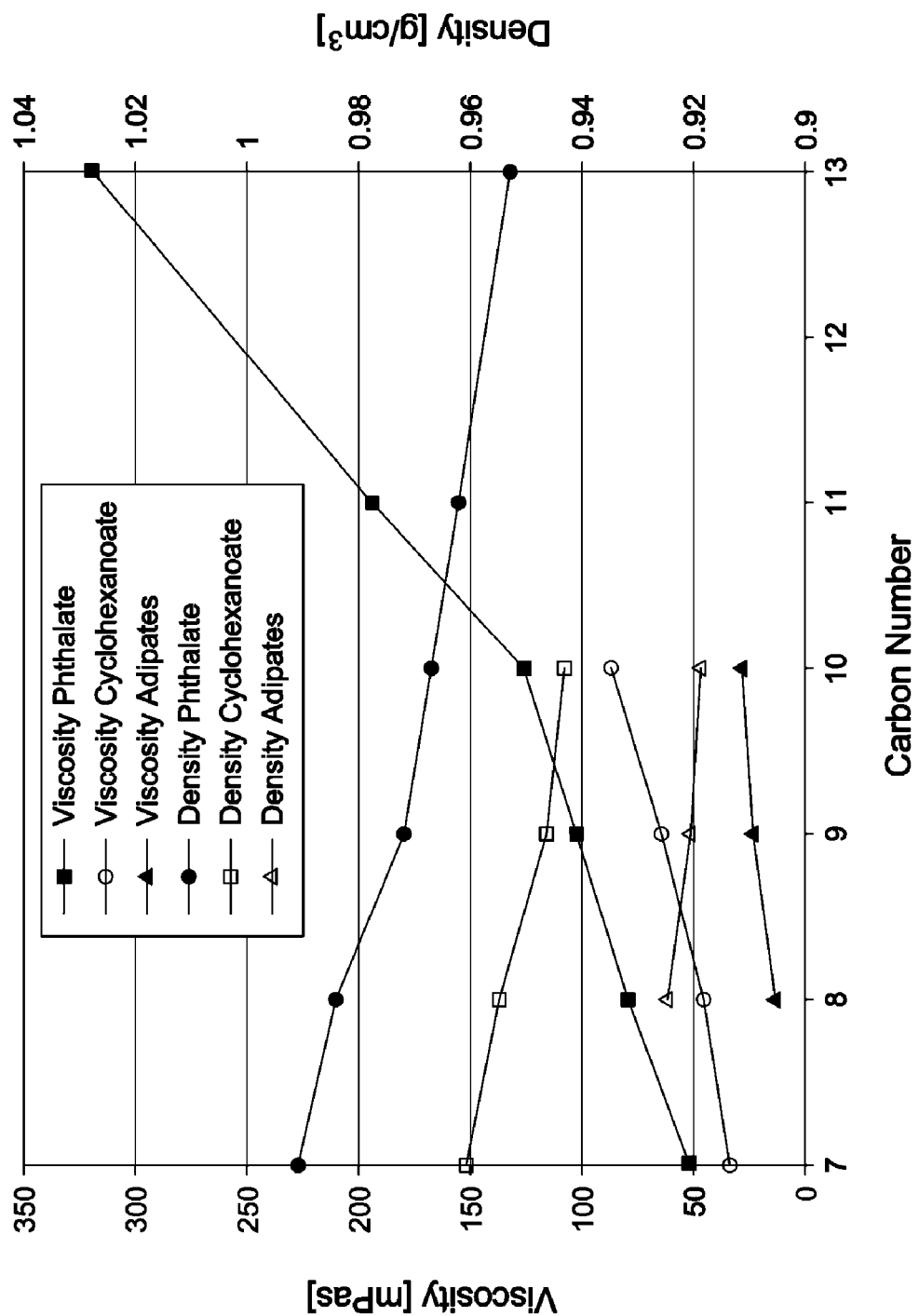
FIG. 1 plots the viscosity and density of esters versus the carbon number of the alcohol used to make the ester.

We have now found that cyclohexanoates may be used as plasticisers in polyvinyl chloride compositions to reduce the amount of polyvinyl chloride required to produce compositions having comparable mechanical properties to those obtained when using phthalates as the plasticiser.

Accordingly, the present invention provides the use of an ester of cyclohexane polycarboxylic acids as plasticisers for polyvinyl chloride compositions to enable the production of a composition having comparable mechanical properties with a reduced amount of polyvinyl chloride. In some embodiments the amount of polyvinyl chloride can be reduced by 0.05 wt %, 1.5 wt %, 2.0 wt %, 2.5 wt % and 3 wt % or any range thereof resulting in 4 to 7% cost savings at comparably plasticiser price.

In particular, the present invention provides polyvinyl chloride composition based on esters of cyclohexane polycarboxylic acids as plasticisers having Shore hardness and tensile strength comparable to compositions based on phthalate plasticisers but requiring less polyvinyl chloride than when the phthalate plasticiser is used. This results in considerable economic benefits, especially in products prepared from plastisols.

The invention is applicable across the range of plasticised polyvinyl chloride materials. It is applicable to the production of semi-rigid polyvinyl chloride compositions which typically contain from 10 to 40 parts, preferably 15 to 35 parts, more preferably 20 to 30 parts of plasticiser per 100 parts of polyvinyl chloride. The invention is also applicable to flexible polyvinyl chloride compositions which typically contain from 40 to 60 parts preferably 44 to 56 parts, more preferably from 48 to 52 parts per 100 parts of polyvinyl chloride and also to the highly flexible compositions which typically contain from 70 to 110 parts, preferably 80 to 100 parts, more preferably 90 to 100 parts of plasticiser per 100 parts of polyvinyl chloride. The parts being by weight.

The semi-rigid compositions are typically used for the production of pipes, some wire and cable coatings, floor tiles, window shades, films, blood bags and medical tubing. Flexible compositions are typically used for the production of sheeting, upholstery, medical tubing, garden hoses, pool liners, water beds and the like. Very flexible compositions are used in the production of coated cloth, toys, shoe soles and the like. The esters of cyclohexane polycarboxylic acid are particularly useful in the production of medical articles such as blood bags and medical tubing and in toys and materials used for food contact such as bottle caps and films where di-2-ethylhexyl phthalate has traditionally been used and there are some concerns about its toxicity.

In another aspect of the present invention the esters of the cyclohexane polycarboxylic acid are used together with other plasticisers. For example, the ester of the cyclohexane polycarboxylic acid may be used with plasticisers such as adipate esters, phthalate esters, trimellitate esters and various polymeric plasticisers, some of which have been described previously. When used in plasticiser blends the relative proportions of the plasticisers that are used will depend upon the desired properties. However we prefer to use at least 5 wt %, more preferably at least 10 wt %, more preferably at least 15 wt %, more preferably at least 20 wt %, more preferably at least 25 wt %, more preferably at least 30 wt %, more preferably at least 35 wt %, more preferably at least 40 wt %, more preferably at least 45 wt %, more preferably at least 50 wt %, more preferably at least 55 wt %, more preferably at least 60 wt %, more preferably at least 65 wt %, more preferably at least 70 wt %, more preferably at least 75 wt %, more preferably at least 80 wt %, more preferably at least 85 wt %, more preferably at least 90 wt %, of the ester of the cyclohexane polycarboxylic acid based on the total weight of plasticiser present. In a preferred embodiment wherein a mixture of plasticisers is used and one of the plasticisers is a phthalate, the mixture preferably comprises no more than 95 wt % cyclohexane polycarboxylic acid. Preferred ranges include between 0.01 and 95 wt %, more preferably 5 to 90 wt %, more preferably 10 to 80 wt %, more preferably 20 to 70 wt %, more preferably 30 to 60 wt % of the ester of the cyclohexane polycarboxylic acid.

We have also found that cyclohexane polycarboxylic acid esters impart an improved stability to ultra-violet light when used as plasticisers in polyvinyl chloride compositions. This improved stability leads to longer service life for materials made from the polyvinyl chloride especially in an environment where they are subjected to sunlight. Throughout this application ultra-violet light stability is measured in the QUV test which is ASTM G 53-84. This is particularly useful where the plasticised polyvinyl chloride composition is to be used in outdoor applications. In particular, this is useful in applications such as roofing, tarpaulins and tents, films such as adhesive tapes and agricultural films, shoes and automobile interiors.

In a further embodiment the present invention therefore provides a plasticised polyvinyl chloride composition containing from 20 to 100 parts by weight, preferably 30 to 90 parts by weight, more preferably 40 to 80 parts by weight, more preferably 50 to 70 parts by weight of a plasticiser composition containing one or more cyclohexane polycarboxylic acid esters as plasticiser per 100 parts of polyvinyl chloride said composition having a stability to ultra-violet light indicated by the low development of colour in the QUV test over 456 hours in a formulation containing 100 parts of solvic 367 polyvinyl chloride, 50 parts of plasticiser, 5 parts of Durcal calcium carbonate filler and 2 parts of LZB 320 stabiliser.

In a further embodiment the present invention provides the use of a plasticised polyvinyl chloride composition containing from 20 to 100 parts by weight preferably 30 to 90 parts by weight, more preferably 40 to 80 parts by weight, more preferably 50 to 70 parts by weight of a plasticiser composition containing one or more cyclohexane polycarboxylic acid esters as plasticiser per 100 parts by weight of polyvinyl chloride in the production of articles said composition having a stability to ultra-violet light, as indicated by the low development of colour in the QUV test over 456 hours in a formulation containing 100 parts of solvic 367 polyvinyl chloride, 50 parts of plasticiser, 5 parts of Durcal calcium carbonate filler and 2 parts of LZB 320 stabiliser.

In a further embodiment, the invention provides roofing, tarpaulins, tents, films, sheeting, floor covering, shoes and automobile interiors obtained from a plasticised polyvinyl chloride composition containing from 20 to 100 parts by weight preferably 30 to 90 parts by weight, more preferably 40 to 80 parts by weight, more preferably 50 to 70 parts by weight of a plasticiser composition containing one or more cyclohexane polycarboxylic acid esters per 100 parts of polyvinyl chloride.

One widespread use of polyvinyl chloride is as a plastisol. A plastisol is a fluid or a paste consisting of a mixture of polyvinyl chloride and a plasticiser optionally containing various additives. A plastisol is used to produce layers of polyvinyl chloride which are then fused to produce coherent articles of flexible polyvinyl chloride. Plastisols are useful in the production of flooring, tents, tarpaulins, coated fabrics such as automobile upholstery, in car underbody coatings, in mouldings and other consumer products. Plastisols are also used in medical uses such as blood bags and tubing, footwear, fabric coating, toys, flooring products and wallpaper. Plastisols typically contain 40 to 200 parts by weight, more typically 50 to 150 parts by weight, more typically 70 to 120 parts by weight, more typically 90 to 110 parts by weight of plasticiser per 100 parts of polyvinyl chloride.

Plastisols are usually made from polyvinyl chloride that has been produced by emulsion polymerisation or micro suspension polymerisation. The plastisol may be produced by the manufacturer of the polyvinyl chloride or a compounder and shipped to the user in fluid form. Alternatively the plastisol may be produced by the user. In either instance, although particularly when the plastisol is produced by the manufacture of the polyvinyl chloride or a compounder, it is important that the plastisol viscosity be stable over time.

Phthalate esters are widely used as plasticisers in plastisols. However, plastisols based on phthalate ester plasticisers suffer from the disadvantages that the viscosity of the plastisol can be undesirably high and that the viscosity of the plastisol can increase to an undesirable extent over time. We have found that when the cyclohexane polycarboxylic acid esters are used as the plasticiser the plastisols also have improved viscosity stability over time, furthermore they also have improved viscosity. This is particularly useful where the plastisol is to be stored for sometime between production and use, for example when it is used in coating applications.

The present invention therefore provides a plastisol composition containing from 40 to 200 parts by weight preferably 50 to 150 parts by weight, more preferably 70 to 120 parts by weight, more preferably 90 to 110 parts by weight of plasticiser per 100 parts of polyvinyl chloride, wherein the plasticiser comprises one or more cyclohexane polycarboxylic acid esters.

In a further embodiment, the present invention provides a process for the production of flexible polyvinyl chloride comprising forming a layer from a plastisol containing from 40 to 200 parts by weight preferably 50 to 150 parts by weight, more preferably 70 to 120 parts by weight, more preferably 90 to 110 parts by weight of a plasticiser composition containing one or more cyclohexane polycarboxylic acid esters per 100 parts by weight of polyvinyl chloride and subsequently fusing the layer by the application of heat.

The use of the esters of cyclohexane polycarboxylic acids as plasticisers for polyvinyl chloride compositions also provides improved cold flex properties. Cold flex leads to an improved service temperature range and is particularly useful in the production of articles used in a wide range of temperatures. Throughout this application the cold flex properties are measured using the Clash and Berg test (ASTM D 1043-84) and the ASTM D 746 brittleness test. The improved cold flex is particularly useful when the plasticised polyvinyl chloride composition is to be used in articles which are used over a wide temperature range. In particular this is useful in applications such as roofing, tarpaulins and tents, protective films including food wrap films, wire and cable, coated fabrics, shoes and medical applications such as blood bags and tubing.

The present invention therefore provides a plasticised polyvinyl chloride composition containing from 20 to 100 parts by weight preferably 30 to 90 parts by weight, more preferably 40 to 80 parts by weight, more preferably 50 to 70 parts by weight of a plasticiser composition containing one or more cyclohexane polycarboxylic acid esters per 100 parts of polyvinyl chloride having a cold flex below −20° C. as measured by the Clash and Berg test on a formulation of 100 parts of Solvic 271 GC polyvinyl chloride, 150 parts of plasticiser, 80 parts of calcium carbonate filler EXH 1SP from Omya, 6 parts of Tribasic lead stearate and 1 part of dibasic lead searate.

The workability of these plastisols still leaves something to be desired and for applications, such as flexible floor coverings it is usual to include additives which will depress the viscosity of the plastisol to an even lower level than that achieved by using only conventional plasticisers. Lower levels of viscosity are commonly achieved by the inclusion of viscosity depressants which are often hydrocarbon fluids such as dodecyl benzene (DDB) such as Jayflex 602. However these materials are increasingly regarded as unacceptable, particularly in applications such as floor coverings, because the finished articles release noticeable amounts of volatile materials when they are stored or are in use at room temperature.

The problem of increased emissions is exacerbated in applications such as floor coverings which are laminates of several layers of polyvinyl chloride because it is desirable to minimise the amount of plasticiser present in the top coating of the floor covering to improve the wearing properties and stain resistance. For ease of processing it is then necessary to use a high level of viscosity depressant. It would therefore be highly desirable to be able to reduce the viscosity of the plastisol during processing without encountering the problem of increasing the emissions of volatile organic compounds from the finished articles.

Viscosity control is important in the conversion of these plastisols into useful products. For example in the preparation of vinyl floor coverings, the plastisol is spread on a surface moving at around 15 to 25 meters per minute in several layers so that the floor covering is literally built up. Typically these layers include a foam core, a decorative layer and a clear protective wear layer. The multilayer products are first gelled by contact with a heated roll and then passed into an oven where they are fused (gelled) at a temperature of from 180° C. to 200° C. Often the gelling is performed after the spreading of each individual layer, starting with the base or encapsulation layer. After the gelling, the next layer can be spread. When all layers have been spread, the product is then passed into an oven to obtain full fusion of all layers together and adequate expansion of the foamed layers.

To fulfill the plastisol spread coating requirements in terms of production speed (adequate viscosity and adequate gelation) a wide range of viscosity regulators, usually viscosity depressants, are used.

Traditional viscosity depressants used today include hydrocarbon fluids, such as Jayflex 615 or Exxsol D100, dodecyl benzene such as Jayflex 602, sold by ExxonMobil Chemical and 2,2,4-trimethylpentanediol diisobutyrate, sold as Texanol by Eastman Chemical or specialty esters based on oleates and laurates. WO97/35060 discloses a plastisol composition comprising a chlorine-containing resin, a primary plasticiser and a $C_{11}$-$C_{14}$ straight chain or branched chain alkyl benzoate.

Although the above products perform well they have limited compatibility (only useful at low concentrations). They also have high volatility, and their effect on gelation temperature, their little or no plasticising effect, their slow fusion with the resin, their cost performance ratio and their contribution to the VOCs emissions from finished products has lead to a search for improved products.

We have now found that the esters of cyclohexane carboxylic acids may be used as viscosity depressants for plastisols particularly plastisols using phthalates as the plasticiser. In a further embodiment the invention therefore provides the use of an ester of a cyclohexane carboxylic acid as a viscosity depressant for plastisols.

In yet a further embodiment the invention provides a plasticised polyvinyl chloride composition comprising polyvinyl chloride and from 20 to 200 preferably 40 to 180, more preferably 60 to 160, more preferably 80 to 140, more preferably 100 to 120 parts per 100 parts of polyvinyl chloride of a plasticiser composition comprising a plasticiser other than an ester of a cyclohexane carboxylic acid and an ester of a cyclohexane carboxylic acid wherein the amount of cyclohexane carboxylic acid ester present is greater than 5 wt % of the total plasticiser content.

We have found that levels above 5 wt % of the ester of cyclohexane carboxylic acid provides a significant reduction in viscosity of the plasticiser composition. We prefer to use from, 5 to 50 wt % of the ester of the cyclohexane carboxylic acid, more preferably from 7 to 30 wt %, more preferably from 10 to 20 wt % based on the total weight of plasticiser.

In a preferred system 5 to 20, preferably 7 to 15, more preferably 10 to 15 wt % of total phthalate of the lower viscosity esters of cyclohexanoic polycarboxylic acids particularly diisoheptyl cyclohexane dicarboxylic acid may be used to replace traditional viscosity depressants used in phthalate based formulations such as dodecyl benzene. The use of the ester of cyclohexane polycarboxylic acid will have the added benefit that the ester will also have a plasticising effect.

Where the ester of a cyclohexane mono-carboxylic acid is to be used in conjunction with a primary plasticiser to act as a viscosity depressant the primary plasticisers may be any of those conventionally used for plasticising chlorine containing resins. These include dialkyl esters of phthalic anhydrides and cycloalkane dicarboxylic acids with monohydric alcohols having from 4 to 13 carbon atoms, dibenzoate esters, alkyl esters of aromatic tri- or tetra-carboxylic acids and aliphatic dicarboxylic acid with monohydric alcohols having 3 to 12, preferably 3 to 10, carbon atoms.

Examples of suitable benzenepolycarboxylic acids or a derivatives thereof with which the esters of the cyclohexane carboxylic acids may be used are the alkyl terephthalates such as monomethyl terephthalate, dimethyl terephthalate, diethyl terephthalate, di-n-propyl terephthalate, di-n-butyl terephthalate, di-tert-butyl terephthalate, diisobutyl terephthalate, monoglycol esters of terephthalic acid, diglycol esters of terephthalic acid, di-n-octyl terephthalate, diisooctyl terephthalate, mono-2-ethylhexyl terephthalate, di-2-ethylhexyl terephthalate, di-n-nonyl terephthalate, diisononyl terephthalate, di-n-decyl terephthalate, di-n-undecyl terephthalate, diisodecyl terephthalate, diisododecyl terephthalate, di-n-octadecyl terephthalate, diisooctadecyl terephthalate, di-n-eicosyl terephthalate, monocyclohexyl terephthalate and or dicyclohexyl terephthalate.

Another suitable class are the alkyl phthalates such as monomethyl phthalate, dimethyl phthalate, diethyl phthalate, di-n-propyl phthalate, di-n-butyl phthalate, di-tert-butyl phthalate, diisobutyl phthalate, monoglycol esters of phthalic acid, diglycol esters of phthalic acid, di-n-octyl phthalate, diisooctyl phthalate, di-2-ethylhexyl phthalate, di-n-nonyl phthalate, diisononyl phthalate, di-n-decyl phthalate, diisodecyl phthalate, di-n-undecyl phthalate, diisododecyl phthalate, di-n-octadecyl phthalate, diisooctadecyl phthalate, di-n-eicosyl phthalate, monocyclohexyl phthalate, dicyclohexyl phthalate; alkyl isophthalates such as monomethyl isophthalate, dimethyl isophthalate, diethyl isophthalate, di-n-propyl isophthalate, di-n-butyl isophthalate, di-tert-butyl isophthalate, diisobutyl isophthalate, monoglycol esters of isophthalic acid, diglycol esters of isophthalic acid, di-n-octyl isophthalate, diisooctyl isophthalate, di-2-ethylhexyl isophthalate, di-n-nonyl isophthalate, diisononyl isophthalate, di-n-decyl isophthalate, diisodecyl isophthalate, di-n-undecyl isophthalate, diisododecyl isophthalate, di-n-octadecyl isophthalate, diisooctadecyl isophthalate, di-n-eicosyl isophthalate, monocyclohexyl isophthalate and or dicyclohexyl isophthalate.

Further examples of commercially benzenepolycarboxylic acid esters with which the esters of the cyclohexane carboxylic acids may be used include phthalates such as: Palatinol® AH (Di-(2-ethylhexyl) phthalate; Palatinol® AH L (Di-(2-ethylhexyl) phthalate); Palatinol® C (Dibutyl phthalate); Palatinol® IC (Diisobutyl phthalate); Palatinol® N (Di-isononyl phthalate); Palatinol® Z (Diisodecyl phthalate) Palatinol® 10-P (Di-(2-Propylheptyl)phthalate); Palatinol® 711P (Heptylundecyl phthalate); Palatinol® 911 (Nonylundecyl phthalate); Palatinol® 11P-E (Diundecyl phthalate); Palatinol® M (Dimethyl phthalate); Palatinol® A (Diethyl phthalate); Palatinol® A (R) (Diethyl phthalate); and Palatinol® K (Dibutylglycol phthalate). Further examples are the commercially available adipates such as: Plastomoll® DOA (Di-(2-ethylhexyl) adipate) and Plastomoll® DNA (Diisononyl adipate).

In one embodiment the invention therefore provides a plastisol of low viscosity which can be used to produce finished articles with low emissions of volatile organic compounds. The composition also provides additional unexpected benefits during processing and to the properties of articles fabricated from the composition. The performance of the ester of a cyclohexane mono-carboxylic acid when used in the mixture of resin and primary plasticiser is surprising in the light of conventional wisdom as to the theory pertaining to useful non-exuding plasticisers. The compatibility of plasticisers with PVC (and their non-exuding behaviour) is usually attributed to the presence of diester or triester groups in the plasticisers, or to the combined presence of an ester group and at least one aromatic ring.

We have also found that the use of cyclohexane polycarboxylic acid esters as plasticisers for polyvinyl chloride also results in improved processability of the polyvinyl chloride compositions. This improved processability is particularly useful in the transformation of the plasticised polyvinyl chloride composition. Transformations include, for example, pelletising, extrusion, injection moulding and calendering. Calendering is used in applications such as the production of roofing, protective films including stationery. Extrusion is used in the production of films, pipes, guttering and wire and cable coatings. Injection moulding is used in the production of shoes, toys and the like.

The present invention therefore further provides the use of from 20 to 100 parts preferably from 30 to 90, more preferably from 40 to 80, more preferably from 50 to 70 by weight of a plasticiser composition containing one or more cyclohexane polycarboxylic acid esters per 100 parts of polyvinyl chloride to improve the processability of a polyvinyl chloride formulation.

In a further embodiment the present invention provides a plasticised polyvinyl chloride composition for use in pelletising, extrusion, injection moulding or calendering containing from 20 to 100 parts preferably from 30 to 90, more preferably from 40 to 80, more preferably from 50 to 70 by weight of a plasticiser composition containing one or more cyclohexane polycarboxylic acid esters per 100 parts by weight of polyvinyl chloride.

In a further embodiment the invention provides extruded articles obtained from a plasticised polyvinyl chloride composition containing from 20 to 100, preferably from 30 to 90, more preferably from 40 to 80, more preferably from 50 to 70 parts by weight of a plasticiser composition containing one or more cyclohexane polycarboxylic acid esters per 100 parts of polyvinyl chloride.

In a further embodiment the invention provides pellets comprising polyvinyl chloride and from 10 to 100, preferably from 30 to 90, more preferably from 40 to 80, more preferably from 50 to 70 parts by weight of a plasticiser composition containing one or more cyclohexane polycarboxylic acid esters per 100 parts of polyvinyl chloride.

In a further embodiment the invention provides injection moulded articles obtained from a plasticised polyvinyl chloride composition containing from 20 to 100, preferably from 30 to 90, more preferably from 40 to 80, more preferably from 50 to 70 parts by weight of cyclohexane polycarboxylic acid esters per 100 parts of polyvinyl chloride.

In a further embodiment the invention provides articles obtained by calendering a plasticised polyvinyl chloride composition containing from 20 to 100, preferably from 30 to 90, more preferably from 40 to 80, more preferably from 50 to 70 parts by weight of a plasticiser composition containing one or more cyclohexane polycarboxylic acid esters per 100 parts by weight of polyvinyl chloride.

We have also found that if esters of cyclohexane polycarboxylic acids are used as plasticisers in one of adjacent layers of plasticised polyvinyl chloride and phthalate plasticisers particularly di-2 ethyl hexyl phthalate are used as plasticiser in the other adjacent layer, the migration of the plasticiser from one layer to the other is reduced as compared with adjacent foils, which contain different of differing amounts of phthalate plasticiser. Undesirably high levels of migration can lead to unsightly crinkling of the multi layer foil.

Accordingly, in a further embodiment the present invention provides a multilayer article in which at least two adjacent layers comprise plasticised polyvinyl chloride wherein the plasticiser in one of said two adjacent layers contains an ester of a cyclohexane polycarboxylic acid.

In a further embodiment, the invention provides the use of any one of the cyclohexane polycarboxylic acid esters mentioned herein as a plasticiser for polyvinyl chloride to reduce the migration of plasticiser between adjacent layers of plasticised polyvinyl chloride at least one of which contains a phthalate ester, particularly di-2 ethyl hexyl phthalate as plasticiser.

Another disadvantage of the currently used flexible polyvinyl chloride containing phthalates as plasticisers is occurring during incineration and accidental fires. Due to the high content of the (aromatic) phthalates a heavy smoke generation can be observed during incineration. We have now found that cyclohexane polycarboxylic acid esters impart a reduced tendency to form smoke on burning when used as plasticisers in polyvinyl chloride compositions. This is particularly useful when the plasticised polyvinyl chloride composition is to be incinerated or is accidentally burnt. Accordingly the use of cyclohexanoates instead of the currently used phthalates can provide products with an improved safety aspect during incineration and accidental fires.

As stated previously as well as the more favourable burning properties, use of the cyclohexanoates also provides a better low temperature flexibility and a lower viscosity than the corresponding phthalates. This will enhance the final product properties by providing a broader application temperature range and easier processing if used in plastisol applications.

The use of esters of cyclohexane polycarboxylic acids as plasticisers for polyvinyl chloride can result in an increase in the temperature required for gelation compared to compositions based on comparable phthalates. Accordingly in a further embodiment of the invention fast fusing plasticisers can be added to the composition containing the ester of the cyclohexane polycarboxylic acid.

In plastisol applications where the esters of cyclohexane dicarboxylic acids such as diisononyl cyclohexanoic acid (DINCH) could be using such as wall coverings, flooring, toys, conveyor belts, synthetic leather. Typical formulations could be, in parts by weight.

| PVC | 100 | Filler | 0-50 |
| Fast fusing plasticiser | 5-25 | Stabilizer | 1-4 |
| DINCH | 30-50 | Other | 0-10 |

Alternatively typical formulations for use in the production of automotive underbody sealants which typically have high plasticiser and high filler could be in parts by weight.

| PVC 100 or PVC copolymer 100 (or combinations of the two). | |
|---|---|
| Fast fusing plasticiser | 20-35 |
| DINCH | 60-90 |
| Filler such as calcium carbonate | 80-150 |
| Stabilizer and other additives | 0-10 |

As a further embodiment formulations for the production of calendered floor tiles could be in parts by weight.

| PVC copolymer 100 or PVC 100 or combinations of the two. | |
|---|---|
| Plasticiser fast fusing | 10-30 |
| DINCH | 20-30 |
| Epoxidized soybean oil | 0-6 |
| Filler | 500-800 (CaCO3) | pigments, stabilizers, other additives 0-10 or as needed

Similar formulations to those set out above could be used but based on other esters of cyclohexane dicarboxylic acid.

Thick extruded materials would also benefit from the addition of a fast fusing plasticiser. Applications include the thick chair mats, water stops, and extruded profiles. For applications where the extruded material may be thicker than 3-4 mm, if the plasticised PVC is not thoroughly mixed in the extruder, the surface is blemished, sometimes dull, sometimes containing mold marks, waves, or streaks. Adding a little fast fusing plasticiser to the plasticiser blend can correct this problem. Examples of suitable formulations for extrusions in parts per hundred are

| PVC | 100 |
|---|---|
| Fast fusing plasticiser | 5-15 |
| DINCH | 10-30 |
| Filler | 0-25 | together with pigments, lubricants, stabilizers, other additives, as needed.

Here again similar formulations based on other esters of cyclohexane dicarboxylic acids could be used.

Examples of non-phthalate fast fusing plasticisers which can be used include diethylene glycol dibenzoate, butyl benzyl phthalate, dipropylene glycol dibenzoate, such as the phenyl cresyl esters of pentadecyl sulfonic aromatic sulfonic acid esters available from Bayer as Mesamoll, citrates such as tributylacetyl citrate, tri-2-ethylhexyl phosphate, trioctyl phosphate such as 2-ethylhexyl-isodecyl phosphate, di-2-ethylhexyl phenyl phosphate, triphenyl phosphate, tricresyl phosphate.

High chlorine content chlorinated paraffins are also known to reduce fusion and fluxing temperatures. Material containing 60 to 70 wt % chlorine can have fusion temps between 75-84° C. while the lower chlorine materials, containing 40 to 54 wt % chlorine, can have fluxing temperatures around 120-135° C.

Low molecular weight diesters such as dibutyl adipate also reduce fusion/flux temperatures although we prefer to use no more than 10 phr of those materials because larger amounts could create an undesirable rise in volatility.

In the embodiments of the present invention reference to systems containing the esters of the cyclohexane carboxylic acids are to systems in which the ester of the cyclohexane carboxylic acid is the sole plasticiser and also to systems in which it is present in admixture with other plasticisers.

Polyvinyl chloride is available in many different forms—the variations being in the molecular weight of the polymer, the molecular weight distribution of the polymer, the particle size of the polymer particles, the particle size distribution and the surface aspect of the particles which may be coarse or smooth. Another variable in polyvinyl chloride is the degree of chain branching. The vinyl polymer may be a copolymer (e.g. a copolymer of vinyl chloride and vinyl acetate). Polymers of vinyl chloride may be obtained by suspension polymerisation or emulsion polymerisation. In suspension polymerisation, vinyl chloride monomer is suspended in water with agitation under carefully controlled temperature and pressure. The batch will also contain suspending agents and initiators. After polymerisation is complete, the batch is discharged to a stripper where unreacted monomer is removed. Finally, the suspension is washed and dried to obtain the suspension polyvinyl chloride.

Typical suspension polymerised polyvinyl chloride consists of agglomerated particles of size in the range 80 to 200 microns. Polyvinyl chloride produced by suspension polymerisation is typically used in dry blend applications. Emulsion polymerised polyvinyl chloride is produced in a similar manner to suspension polyvinyl chloride except that the vinyl chloride monomer is emulsified in water so that the polymerisation results in latex particles. The ratio of water to vinyl chloride monomer in emulsion polymerisation is greater than the ratio of water to vinyl chloride monomer in suspension polymerisation. Emulsion polymerised polyvinyl chloride also consists of agglomerated particles but the particles are generally smaller than the particles of suspension polymerised polyvinyl chloride. Typically, the agglomerated particles of emulsion polyvinyl chloride have a particle size in the range of 15 to 20 microns. Emulsion polymerised polyvinyl chloride is generally used in the production of plastisols which are used in coating operations where the plastisol is coated onto a substrate and is then fused by heating.

Polyvinyl chloride of particle size between 1 and 40 microns may be produced by micro suspension polymerisation.

Different forms of polyvinyl chloride are used in different applications. One important property is the mean molecular weight of the polymer. A factor known as the K value is used to indicate the mean molecular weight of polyvinyl chloride. The K value is the viscosity of a 0.005 wt % solution of the polyvinyl chloride in cyclohexanone at 25° C. as measured using an Ubbelhode viscometer. The K value is the German standard DIN 53726. The K value of the polyvinyl chloride impacts the fusion temperature and gellation rate of the plasticised polyvinyl chloride composition. The K value also influences the melt viscosity of the plasticised polyvinyl chloride composition and the rate at which the composition can be foamed. Typically the higher the K value the better the mechanical properties but the lower the flowability. Accordingly, the formulator of polyvinyl chloride will select the nature of the polyvinyl chloride and the nature of the plasticiser to optimise the properties for a particular use.

Where plasticised polyvinyl chloride is to be used in calendering operations, it is preferred to use a suspension polymerised polyvinyl chloride having a K value in the range 65 to 70. Where the plasticised polyvinyl chloride is to be used in wire and cable applications, it is preferred to use a suspension polymerised polyvinyl chloride having a K value above 70. For injection moulding, a polyvinyl chloride having a K value of 60 to 67 is preferred. Emulsion polymerised polyvinyl chloride is preferred for applications where good flow of the plasticised polyvinyl chloride is required such as spread coating, as used in the manufacture of flooring, chemical foaming, dip coating and rotational moulding. For spread coating an emulsion polyvinyl chloride of K value 65 to 75 is preferred and for chemical foaming, dip-coating and rotational moulding a K value of 65 to 70 is preferred.

The plasticisers used in the present invention are esters of cyclohexane polycarboxylic acids. The cyclohexane polycarboxylic acids may be the 1,2 dicarboxylic acids, the 1,3 dicarboxylic acids or the 1,4 dicarboxylic acids. Alternatively, the plasticisers may be esters of the tricarboxylic acids such as 1,3,5, 1,2,3 and 1,2,4 tricarboxylic acids. Mixtures of these acids may also be used. Any alcohol may be used to esterify the acids although it is preferred to use alcohols containing from 5 to 20 carbon atoms in particular alcohols containing from 8 to 12 carbon atoms are preferred.

The Hexamoll DINCH product recently introduced by BASF is an example of a cyclohexane dicarboxylic acid ester which can be used in the present invention. U.S. Pat. No. 6,284,917 to BASF provides an illustration of one method by which these materials may be prepared.

Examples of cyclohexane carboxylic acid esters which may be used in the various embodiments of the present invention include 1,2-cyclohexane dicarboxylic acid diisobutyl, 1,2-cyclohexane dicarboxylic acid dicyclohexyl, 1,2-cyclohexane dicarboxylic acid diiso heptyl, 1,2-cyclohexane dicarboxylic acid di (3,5,5-trimethyl hexyl), 1,2-cyclohexane dicarboxylic acid di (2,6-di methyl-4-heptyl), 1,2-cyclohexane dicarboxylic acid diisodecyl, 1,2-cyclohexane dicarboxylic acid diisoundecyl, 1,2-cyclohexane dicarboxylic acid diiso tridecyl, 1,2-cyclohexane dicarboxylic acid diiso octadecyl, diiso octadecyl, 3-methyl-1,2-cyclohexane dicarboxylic acid diisobutyl, 3-methyl-1,2-cyclohexane dicarboxylic acid dicyclohexyl, 3-methyl-1,2-cyclohexane dicarboxylic acid diiso heptyl, 3-methyl-1,2-cyclohexane dicarboxylic acid di (2-ethylhexyl), 3-methyl-1,2-cyclohexane dicarboxylic acid di (3,5,5-trimethyl hexyl), 3-methyl-1,2-cyclohexane dicarboxylic acid di (2,6-di methyl-4-heptyl), 3-methyl-1,2-cyclohexane dicarboxylic acid diisodecyl, 3-methyl-1,2-cyclohexane dicarboxylic acid diisoundecyl, 3-methyl-1,2-cyclohexane dicarboxylic acid diiso tridecyl, 3-methyl-1,2-cyclohexane dicarboxylic acid diiso octadecyl, 4-methyl-1,2-cyclohexane dicarboxylic acid diisobutyl, 4-methyl-1,2-cyclohexane dicarboxylic acid dicyclohexyl, 4-methyl-1,2-cyclohexane dicarboxylic acid diiso heptyl, 4-methyl-1,2-cyclohexane dicarboxylic acid di (3,5,5-trimethyl hexyl), 4-methyl-1,2-cyclohexane dicarboxylic acid di (2,6-di methyl-4-heptyl), 4-methyl-1,2-cyclohexane dicarboxylic acid diisodecyl, 4-methyl-1,2-cyclohexane dicarboxylic acid diisoundecyl, 4-methyl-1,2-cyclohexane dicarboxylic acid diiso tridecyl, 4-methyl-1,2-cyclohexane dicarboxylic acid diiso octadecyl.

Cyclohexane polycarboxylic acid straight chain alkyl ester, usually, jointly using with one, two or more kinds of the aforementioned alicyclic polycarboxylic acid branched alkyl ester and/or cycloalkyl ester may also be used.

Examples of the straight chain alkyl ester include 1,2-cyclohexane dicarboxylic acid di heptyl, 1,2-cyclohexane dicarboxylic acid dioctyl, 1,2-cyclohexane dicarboxylic acid di decyl, 1,2-cyclohexane dicarboxylic acid di undecyl, 1,2- cyclohexane dicarboxylic acid di dodecyl, 1,2-cyclohexane dicarboxylic acid di tetradecyl, 1,2-cyclohexane dicarboxylic acid dihexadecyl, 1,2-cyclohexane dicarboxylic acid dioctadecyl, 3-methyl-1,2-cyclohexane dicarboxylic acid di heptyl, 3-methyl-1,2-cyclohexane dicarboxylic acid dioctyl, 3-methyl-1,2-cyclohexane dicarboxylic acid di decyl, 3-methyl-1,2-cyclohexane dicarboxylic acid di undecyl, 3-methyl-1,2-cyclohexane dicarboxylic acid di dodecyl, 3-methyl-1,2-cyclohexane dicarboxylic acid di tetradecyl, 3-methyl-1,2-cyclohexane dicarboxylic acid dihexadecyl, 3-methyl-1,2-cyclohexane dicarboxylic acid dioctadecyl, 4-methyl-1,2-cyclohexane dicarboxylic acid di heptyl, 4-methyl-1,2-cyclohexane dicarboxylic acid dioctyl, 4-methyl-1,2-cyclohexane dicarboxylic acid di decyl, 4-methyl-1,2-cyclohexane dicarboxylic acid di undecyl, 4-methyl-1,2-cyclohexane dicarboxylic acid di dodecyl, 4-methyl-1,2-cyclohexane dicarboxylic acid di tetradecyl, 4-methyl-1,2-cyclohexane dicarboxylic acid dihexadecyl, 4-methyl-1,2-cyclohexane dicarboxylic acid dioctadecyl.

Other cyclohexane carboxylic acid esters include those derived from phthalates and in particular the following: cyclohexane-1,2-dicarboxylic acid di(isopentyl) ester, obtainable by hydrogenation of a di(isopentyl)phthalate having the Chemical Abstracts registry number (in the following: CAS No.) 84777-06-0; cyclohexane-1,2-dicarboxylic acid di(isoheptyl) ester, obtainable by hydrogenating the di(isoheptyl)phthalate having the CAS No. 71888-89-6; cyclohexane-1,2-dicarboxylic acid di(isononyl) ester, obtainable by hydrogenating the di(isononyl)phthalate having the CAS No. 68515-48-0; cyclohexane-1,2-dicarboxylic acid di(isononyl) ester, obtainable by hydrogenating the di(isononyl)phthalate having the CAS No. 28553-12-0, which is based on n-butene; cyclohexane-1,2-dicarboxylic acid di(isononyl) ester, obtainable by hydrogenating the di(isononyl)phthalate having the CAS No. 28553-12-0, which is based on isobutene; a 1,2-di-$C_9$-ester of cyclohexane dicarboxylic acid, obtainable by hydrogenating the di(nonyl)phthalate having the CAS No. 68515-46-8; cyclohexane-1,2-dicarboxylic acid di(isodecyl) ester, obtainable by hydrogenating a di(isodecyl)phthalate having the CAS No. 68515-49-1; 1,2-$C_{7-11}$-ester of cyclohexane dicarboxylic acid, obtainable by hydrogenating the corresponding phthalic acid ester having the CAS No. 68515-42-4; 1,2-di-$C_{7-11}$-ester of cyclohexane dicarboxylic acid, obtainable by hydrogenating the di-$C_{7-11}$-phthalates having the following CAS Nos.: 111381-89-6, 111381-90-9, 111381-91-0, 68515-44-6, 68515-45-7 and 3648-20-7; a 1,2-di-$C_{9-11}$-ester of cyclohexane dicarboxylic acid, obtainable by hydrogenating a di-$C_{9-11}$-phthalate having the CAS No. 98515-43-5; a 1,2-di(isodecyl)cyclohexane dicarboxylic acid ester, obtainable by hydrogenating a di(isodecyl)phthalate, consisting essentially of di-(2-propylheptyl)phthalate; 1,2-di-$C_{7-9}$-cyclohexane dicarboxylic acid ester, obtainable by hydrogenating the corresponding phthalic acid ester, which comprises branched and linear $C_{7-9}$-alkylester groups; respective phthalic acid esters which may be e.g. used as starting materials have the following CAS Nos.: di-$C_{7-9}$-alkylphthalate having the CAS No. 111 381-89-6; di-$C_7$-alkylphthalate having the CAS No. 68515-44-6; and di-$C_9$-alkylphthalate having the CAS No. 68515-45-7.

More preferably, the above explicitly mentioned $C_{5-7}$, $C_9$, $C_{10}$, $C_{7-11}$, $C_{9-11}$ and $C_{7-9}$ esters of 1,2-cyclohexane dicarboxylic acids are the hydrogenation products of the commercially available benzenepolycarboxylic acid esters with the trade names Jayflex® DINP (CAS No. 68515-48-0), Jayflex® DIDP (CAS No. 68515-49-1), Palatinol® 9-P, Vestinol® 9 (CAS No. 28553-12-0), TOTM-I® (CAS No. 3319-31-1), Linplast® 68-TM and Palatinol® N (CAS No. 28553-12-0) which are used as plasticisers in plastics.

A particularly preferred ester comprises a mixture of diesters of cyclohexanoic dicarboxylic acid with a mixture of alcohols having an average carbon number between 8.5 and 9.5 in whose $^1$H-NMR spectrum, obtained in deuterated choroform (CDCl3), the ratio [R2] of the surface area below the resonance signals with chemical shifts in the range between the lowest valley close to 1.0 and 2.0 towards tetramethylsilane (TMS) to the surface area below the resonance signals with chemical shifts in the range between 0.5 and the lowest valley close to 1.0 ppm towards TMS is between 1.35 and 5.50.

In the $^1$H-NMR-measurement used to characterise the alcohols used to produce the esters a dilute solution of the alcohol in deuteroform is used as the sample and the average carbon number is determined as follows. The alkyl-protons between 2 and 0.4 ppm are integrated and the —CH2O-protons between 3.9 and 3 ppm are also integrated. The hydroxyl proton can be observed between 3 and 2 ppm. With I (n–m ppm) representing the integration of the region between n and m ppm relative to TMS:

$$\text{Average carbon number} = \frac{(I(2 - 0.4 \text{ ppm}) + 0.5 \times I(3.9 - 3 \text{ ppm}))}{I(3.9 - 3 \text{ ppm})}$$

For the phthalates, the —CH2O-protons of the ester group are seen in the region between 6 and 3 ppm, typically between 5 and 3.5 ppm. The protons on the aromatic ring are seen before 7.5 ppm and do not influence the integration. The above formula for the phthalates is therefore as follows:

$$\text{Average carbon number} = \frac{(I(2 - 0.4 \text{ ppm}) + 0.5 \times I(5 - 3.5 \text{ ppm}))/}{I(5 - 3.5 \text{ ppm})}$$

The formulae used are based on the stoichiometric formula of a saturated primary alcohol. If it has an average carbon number of x, its formula is

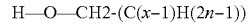

H—O—CH2-(C(x–1)H(2n–1))

The arithmetic takes the (2n–1) from the alkyl chain excluding the —CH2O-protons, adds 0.5×2=1 from the —CH2O-protons. This sums up to 2n in the numerator. The denominator is the 2 from the —CH2O-protons, and 2n/2 makes n, i.e. the average carbon number on the alkyl chain.

For cyclohexanoates, one has to discount the 8 protons on the cyclohexane ring in each molecule, and which are showing up also in the range 1.0-2.0 ppm, amongst the protons of the alkyl chain. This can be done by subtracting from the numerator 2 times the I (5–3.5 ppm), as there are 8 such protons in the ring against 4-CH2O-protons in each cyclohexanoate molecule. Hence for cyclohexanoates $$\text{Average carbon number} = \frac{(I(2 - 0.4 \text{ ppm}) - 1.5 \times I(5 - 3.5 \text{ ppm}))/}{I(5 - 3.5 \text{ ppm})}$$

In certain embodiments of the invention the cycloalkane plasticisers described herein preferably exclude a 1,2-cyclohexane dicarboxylic acid diester obtained by esterifying 1,2-cyclohexane dicarboxylic acid and mixed aliphatic monohydric alcohols of from 4 to 13 carbons, characterised in that the above mentioned mixed aliphatic monohydric alcohols comprise from 80 to 97% by weight of C9 branched alcohols and from 3 to 20% by weight of alcohols other than C9 branched alcohols.

The esters may be obtained by the esterification of the cyclohexane polycarboxylic acids or the corresponding anhydrides. Alternatively they may be prepared by the Diels Alder condensation of butadiene and maleic anhydride followed by hydrogenation and esterification. Another method by which the esters may be obtained is the hydrogenation of the corresponding phthalates as is described in PCT Publication WO 99/32427.

The polyvinyl chloride and the ester of the cyclohexane polycarboxylic acid may be mixed by the conventional formulating techniques currently used in the production of plasticised polyvinyl chloride formulations. The formulator will attempt to provide a versatile composition having a good balance of properties at reasonable cost. The formulator will be concerned to optimise the balance between end-product properties such as flexibility, low temperature performance, flame resistance, high temperature resistance, volatility, stain resistance, electrical properties and processability and the processing properties such as plastisol viscosity, fusion, dry blending, emissions and printability.

The formulations containing the polyvinyl chloride and the plasticiser may contain other additives. The majority of formulations will contain a stabiliser which counters the effects of ageing; heat stabilisers also reduce the dehydrodehalogenation of the polyvinyl chloride at the temperatures at which the formulation is processed. Stabilisers, such as benzotriazole and benzophenone, also reduce the degradation by sunlight, ozone and biological agents. The improved ultra-violet stability obtained by the use of the esters of the cyclohexane polycarboxylic acids according to the present invention may enable smaller amounts of stabilisers to be used. Typically, the formulations contain from 0.5 to 10 parts, normally from 1.5 to 3 parts, by weight of stabiliser per 100 parts of the polyvinyl chloride.

Stabilizers to provide stability during heat processing are typically metal compounds, particularly lead salts, which are used in wire and cable applications, organotin compounds, barium, cadmin and zinc salts or calcium/zinc stabilisers. Organic phosphates and polyols may also be used. Lead stabilisers are used in wire and cable applications. Calcium/zinc stabiliser systems are used in wire and cable, foil and sheeting, wall coverings, medical applications, tubes and footwear, food packaging film and fabric coating. Barium/zinc stabiliser systems are used in foil and sheeting, flooring, wall covering, tubes and footwear and fabric coating. Tin stabilisers are used in flooring and wall covering. Zinc compounds are frequently used as a stabiliser and as a kicker in formulations used to produce foams in, for example, flooring, wall covering and fabric coating.

Other ingredients which may be added to the polyvinyl chloride formulations include fillers such as calcium carbonate, titanium dioxide or silica. When used, the filler may be present in an amount up to 150 parts, preferably up to 100 parts per 100 parts of polyvinyl chloride. Lubricants, pigments and processing acids may be included. Other ingredients will be chosen according to the use to which the formulation is to be put. For example, the formulation may contain flame retardants, blowing agents and kickers, bio-stabilisers, antistatic agents, viscosity regulators such as thickeners and thinners, antifogging agents which are particular useful is packaging films and antioxidants, such as bisphenol A.

Fillers are incorporated in the formulations to reduce cost, increase the output of dry blending, increase electrical resistance, increase resistance to ultra-violet light, increase hardness, produce improved heat transmission, increase the resistance to heat deformation. Fillers can also impart anti-blocking or anti-slip performance. Examples of suitable fillers include calcium carbonate, clays such as alumino-silicates, silica, dolomite and bauxite.

The particular particle size distribution and average surface area of the filler will be chosen according to the properties it is desired to impart.

Lubricants and processing aids may be included to reduce the adhesion between polyvinyl chloride and hot machinery surfaces during processing. The lubricants also affect the frictional properties between resin particles during processing. Examples of lubricants include stearic acid and metal stearates which can also act as stabilisers. Other lubricants that may be used include petroleum waxes, silicon oil, mineral oil, synthetic oils and polyethylene waxes.

The formulations may also contain flame retardants to increase ignition time, reduce flame spreading and rate of burning. The flame retardants should have a high decomposition temperature, low volatility, a minimum effect on thermal and mechanical properties and good resistance to light and ultra-violet radiation. Examples of flame retardants that may be used include halogen containing compounds and phosphorous containing organic compounds such as triaryl, trialkyl or alkyl diaryl phosphate esters. Other materials that may be used include chloroparaffins, aluminum trihydrate $Al(OH)_3$ or antimony oxides $Sb_2O_3$.

Where the formulations are used to produce foams such as in flooring materials, they can contain a blowing agent which decomposes with the evolution of gas bubbles during processing of the plastisol. Examples of suitable blowing agents include azodicarbonamide which releases nitrogen when heated to a temperature in the range 200° C. to 250° C. The system may also contain kickers which control and lower the decomposition temperature of the blowing agent. For example lead compounds such as dibasic lead phthalate, zinc oxide or barium/cadmium compounds may be used to reduce the activation temperature of azodicarbonamide to a temperature in the range 150° C. to 215° C. These metal compounds can also act as stabilisers.

The present invention is illustrated by the following examples in which the $C_7$, $C_8$, $C_9$ and $C_{10}$ esters of bis-1.2-cyclohexanedicarboxylic anhydride were prepared using the commercial $C_7$ alcohol available from ExxonMobil Chemical Exxal 7 to produce the $C_7$ ester (DIHCH), 2 ethyl hexanol to produce the $C_8$ ester (DEHCH), the commercial $C_8$ alcohol available as Exxal 8 from ExxonMobil Chemical to produce $C_8$ ester (DIOCH), the commercial $C_9$ alcohol available from ExxonMobil Chemical as Exxal 9 to produce the $C_9$ ester (DINCH) and the commercial $C_{10}$ alcohol available from ExxonMobil Chemical as Exxal 10 to produce the $C_{10}$ ester (DIDCH). A standard esterification procedure using a titanium catalyst was used such as is described in the Encyclopedia of Chemical Technology, Jaqueleine I Kroschwitz, Mary Howe-Grant, fourth edition, vol 9 pages 755-780 by John Wiley and Sons. For ease of reference the materials are referred to as cyclohexanoic esters.

The reaction therefore proceeds as follows.

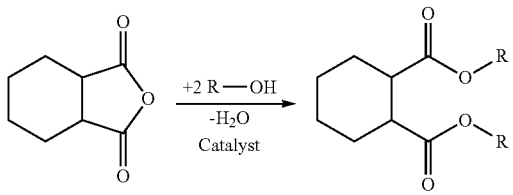

The properties of the materials were measured using the test methods set out in Table 1 and were found to be as shown in Table 1:

TABLE 1

| Property | Method | Unit | DIHCH | DEHCH | DINCH | DIDCH |
|---|---|---|---|---|---|---|
| Viscosity @ 20° C. | ASTM D445 | mPa*s | 34.0 | 45.5 | 64.7 | 87.0 |
| Density @ 20° C. | ASTM D4052 | g/cm³ | 0.961 | 0.955 | 0.946 | 0.943 |
| Water content | ASTM E1064 | ppm | 154 | 64 | 111 | 69 |
| Acid value | ASTM D1045 | mg/g KOH | 0.11 | 0.03 | 0.03 | 0.04 |

The properties of the cyclohexanoic esters were compared to those of the corresponding phthalates made with the same alcohols, di-2-ethyl hexyl phthalate (DEHP); di-isoheptyl phthalate (Jayflex 77); di-isononyl phthalate (DINP) and di-isodecyl phthalate (DIDP).

FIG. 1 plots the viscosity and density of the different esters against the carbon number of the alcohol used to make the ester. FIG. 1 shows that the viscosity of the cyclohexanoic ester is below that of the corresponding phthalate. This will lead to a lower viscosity of plastisols based on the cyclohexanoic esters and therefore to easier processing of the plastisols.

FIG. 1 also shows that the density of the cyclohexanoic ester is below the density of the corresponding phthalate. This has the benefit that in formulations using the cyclohexanoic ester as plasticiser the volume of the same weight of the plasticised polyvinyl chloride is greater than in comparable formulations using the phthalate ester as the plasticiser. This enables more final product to be made from formulations containing less polyvinyl chloride, in addition the lower efficiency of the cyclohexanoate esters reinforces this effect.

Example 1

The esters as manufactured above were tested as plasticisers in flexible polyvinyl chloride.

The products were used as plasticiser in the following plastisol formulations:

| | |
|---|---|
| SOLVIC 367 NC (Polyvinyl chloride from Solvin) | 100 phr |
| Plasticiser | 50 phr |
| Durcal 5 (calcium carbonate filler) | 10 phr |
| LZB 320 (Lankromark from Akcros Chemicals) | 2 phr |

All formulations were prepared at the same plasticiser level.

Figure 2:
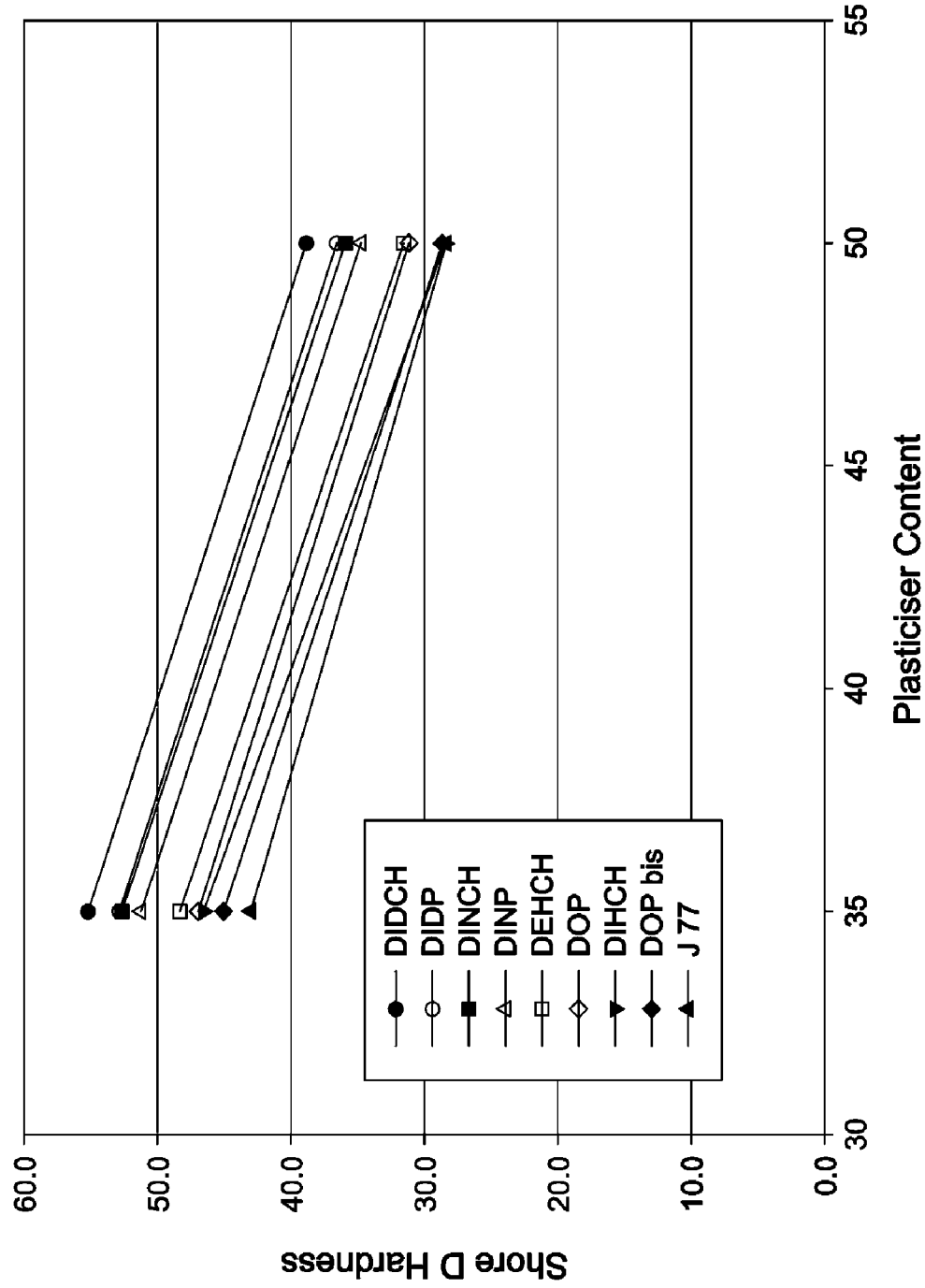
FIG. 2 plots the relative shore D hardness versus plasticiser content.

FIG. 2 shows the relative shore D hardness versus plasticiser content of this formulation and also the film and sheet formulation.

Figure 3:
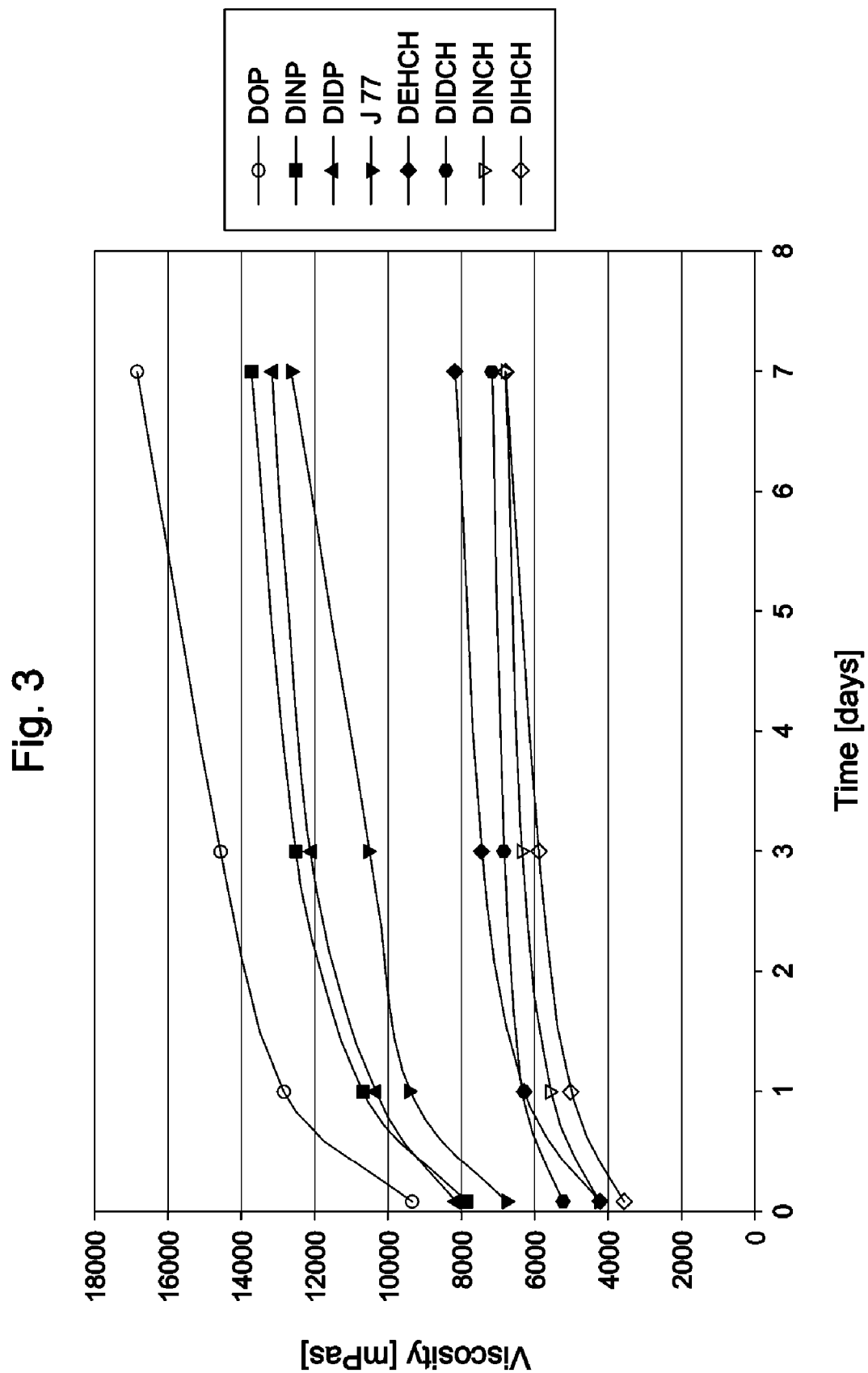
FIG. 3 plots the Brookfield viscosity of the plastisols versus time.

FIG. 3 shows the initial viscosities of the plastisols and plots the Brookfield viscosity of the plastisols during storage over a 7 day period. The viscosities were measured with a Brookfield viscometer. FIG. 3 shows that the plastisol based on the cyclohexanoic ester have a significantly lower initial viscosity than the plastisol based on the corresponding phthalate. FIG. 3 also shows that the stability over time of the viscosity of the plastisol using the cyclohexanoic ester as the plasticiser was better than the corresponding phthalate based plastisol. This indicated that the cyclohexanoic esters could therefore be used not only as a primary plasticiser but also as viscosity depressants in plastisol applications.

0.6 mm gauge films were produced from these plastisol formulations by spread coating plastisols with a knife on a release paper and heating the coated paper in a Werner Mathis oven at 180° C. for 1 minute. The films were then evaluated for hardness, thermal stability and stability to ultra-violet light. Hardness is measured according to the DIN 53505 test method which is also ASTM D 2240-86.

The hardness was found to be as set out in Table 2.

TABLE 2

| Plasticiser | J77 | DIHCH | DOP | DEHCH | DINP | DINCH | DIDP | DIDCH |
|---|---|---|---|---|---|---|---|---|
| Shore A | 78.2 | 79.3 | 81.5 | 81.8 | 85.0 | 86.3 | 86.2 | 89.1 |
| Shore D | 28.3 | 28.4 | 31.1 | 31.5 | 34.9 | 36.0 | 36.6 | 38.9 |

The thermal stability of each film was tested in the Werner Mathis thermo tester at 180° C. (90 sec/cm). The results were as follows.

| | |
|---|---|
| Formulation 1: DOP | 33 min |
| Formulation 2: DEHCH | 32.3 min |
| Formulation 3: DINP | 28.5 min |
| Formulation 4: DINCH | 30 min |
| Formulation 5: DIDP | 28.5 min |
| Formulation 6: DIDCH | 30.8 min |
| Formulation 7: DIHCH | 36.3 min |
| Formulation 8: Jayflex 77 | 38.7 min |

These results indicate comparable stability between the cyclohexanoic esters and the phthalates.

The stability of the films to ultra-violet light was tested in a QUV (Cycle: 4 hours UV at 60° C., 4 hours condensation at 50° C.). Lack of stability is indicated by a darkening of the film samples. Evaluations of the colouring of the samples were made after 220 hours, 456 hours, 626 hours, 794 and 1056 hours of test.

The color of the samples is shown in the Table 3. It can be seen that the darkening over time of the cyclohexanoic esters based formulations was less than that of the formulations based on the corresponding phthalates.

TABLE 3

| Plasticiser | DOP | DEHCH | DINP | DINCH | DIDP | DIDCH |
|---|---|---|---|---|---|---|
| Original | White | White | White | White | White | White |
| After 220 Hours | Pale Yellow | White | Pale Yellow | White | Pale Yellow | White |
| After 456 Hours | Yellow | White | Yellow | White | Yellow | Pale Yellow |
| After 626 Hours | Yellow | White | Yellow | White | Yellow | Yellow |
| After 794 Hours | Yellow | Pale Yellow | Yellow | Pale Yellow | Yellow Brown | Yellow Brown |
| After 1056 Hours | Dark Yellow | Yellow | Yellow Brown | Yellow | Yellow Brown | Yellow Brown |

After 794 hours the differences between the phthalates and the cyclohexanoic esters start to level off, however, even after that length of test the samples containing DEHCH and DINCH were outperforming films containing the corresponding phthalates.

Example 2

The following wire and cable coating compounds were prepared.

| Solvic 271 GC | 100 phr | 100 phr | 100 phr | 100 phr |
|---|---|---|---|---|
| DOP | 50 phr | | 100 phr | |
| DEHCH | | 50 phr | | 100 phr |
| Filler - calcium carbonate (EXH1SP from Omya) | 80 phr | 80 phr | 80 phr | 80 phr |
| Tribasic lead stearate (Interstab PTS-E from Akcros Chemicals) | 6 phr | 6 phr | 6 phr | 6 phr |
| Dibasic lead stearate (Interstab P51 from Akcros Chemicals) | 1 phr | 1 phr | 1 phr | 1 phr |

Similar compounds were produced containing DINP, DINCH, DIDP and DIDCH as plasticisers. The plasticiser contents were chosen to produce materials of comparable hardness and were as follows
  i. the DINP formulations contained 53 (106) phr plasticiser.
  ii. the DINCH formulations contained 54.5 (109) phr plasticiser.
  iii. the DIDP formulations contained 55 (110) phr plasticiser.
  iv. the DIDCH formulations contained 57.5 (115) phr plasticiser.

The Shore A and Shore D hardness (ASTM D 2240-86) was measured and found to be as shown in Table 4.

TABLE 4

| | DOP | DEHCH | DINP | DINCH | DIDP | DIDCH |
|---|---|---|---|---|---|---|
| phr | 50 | 50 | 53 | 54.5 | 55 | 57.5 |
| Shore A | 90.3 | 90.9 | 91.2 | 91 | 90.4 | 91.7 |
| Shore D | 38.2 | 38 | 38.7 | 38 | 38 | 36.4 |

Table 4 shows that comparable hardness can be obtained with the cyclohexanoic esters using less polyvinyl chloride.

The low temperature flexibility of the materials was measured using the Clash and Berg test (ASTM D 1043-84) and the ASTM D 746 brittleness test and were found to be as set out in Table 5.

TABLE 5

| | DOP | DEHCH | DINP | DINCH | DIDP | DIDCH |
|---|---|---|---|---|---|---|
| Clash & Berg ° C. | −17.0 | −20.7 | −18.1 | −26.0 | −21.7 | −29.7 |
| Brittleness | −14.0 | −16.2 | −16.8 | −22.0 | −19.6 | −26.5 |

Here the lower Clash and Berg and brittleness temperatures show the improved low temperature properties of the cyclohexanoic esters.

Example 3

Foil and sheeting compounds were prepared according to the following formulation.

| Solvic 271 GC | 100 phr |
|---|---|
| Plasticiser | 35 phr |
| Ba/Zn Stabiliser (Lankromark - LZB 722 from Akcros Chemicals) | 2 phr |
| ESBO (epoxidised soya bean oil - lubricant) | 0.5 phr |

The Shore D hardness of the formulations containing various plasticisers were found to be as shown in Table 6.

TABLE 6

| | DOP | DEHCH | DINP | DINCH | DIDP | DIDCH |
|---|---|---|---|---|---|---|
| Shore D | 47 | 48.3 | 51.4 | 52.7 | 52.9 | 55.2 |

The mechanical properties were obtained from samples in a Zwick tensile tester measuring the modulus at 100% extension, the stress at break and the elongation at break. The results are set out in Table 7.

TABLE 7

| | Modulus at 100% (N/mm$^2$) | Stress at break (N/mm$^2$) | Elongation at break (%) |
|---|---|---|---|
| DOP (50 phr) | 10.9 | 15.6 | 301 |
| DEHCH (50 phr) | 11.4 | 14.5 | 223* |
| DINP (53 phr) | 10.7 | 15.1 | 289 |
| DINCH (54.5 phr) | 10.5 | 14.9 | 290 |
| DIDP (55 phr) | 11.2 | 16.0 | 299 |
| DIDCH (57.5 phr) | 10.4 | 13.5 | 235 |

The same mechanical properties were measured on samples that had been aged at 100° C. for 7 days with natural ventilation and the results are set out in Table 8 which shows the percentage retained properties after ageing in relation to the original data in Table 7.

TABLE 8

| | Retained Modulus at 100% (N/mm$^2$) | Retained Stress at break (N/mm$^2$) | Retained Elongation at break (%) |
|---|---|---|---|
| DOP (50 phr) | 98.6 | 95.5 | 90.8 |
| DEHCH (50 phr) | 95.1 | 96.2 | 105.6 |

TABLE 8-continued

|  | Retained Modulus at 100% (N/mm²) | Retained Stress at break (N/mm²) | Retained Elongation at break (%) |
| --- | --- | --- | --- |
| DINP (53 phr) | 100.7 | 94.1 | 87.5 |
| DINCH (54.5 phr) | 104.4 | 94.2 | 84.3 |
| DIDP (55 phr) | 107.0 | 98.5 | 87.0 |
| DIDCH (57.5 phr) | 99.0 | 96.8 | 100.5 |

The weight loss of the samples after ageing was measured and found to be as set out in Table 9.

TABLE 9

| Weight Loss | DOP | DEHCH | DINP | DINCH | DIDP | DIDCH |
| --- | --- | --- | --- | --- | --- | --- |
| (mg/cm2) | 0.60 | 1.92 | 0.26 | 0.53 | 0.21 | 0.27 |
| % | 0.79 | 2.49 | 0.35 | 0.72 | 0.27 | 0.38 |

The weight loss shows DEHCH to have a higher volatility which may limit the use of DEHCH in wire and cable applications. However, the data shows that by changing to DINCH or DIDCH this drawback can be overcome.

All of the compounds except the DEHCH based compound passed the German wire and cable standards YI4, YI5, YM3 and YM5.

This data shows that in most of the applications DOP, DINP or DIDP can be substituted by DINCH or DIDCH.

Figure 4:
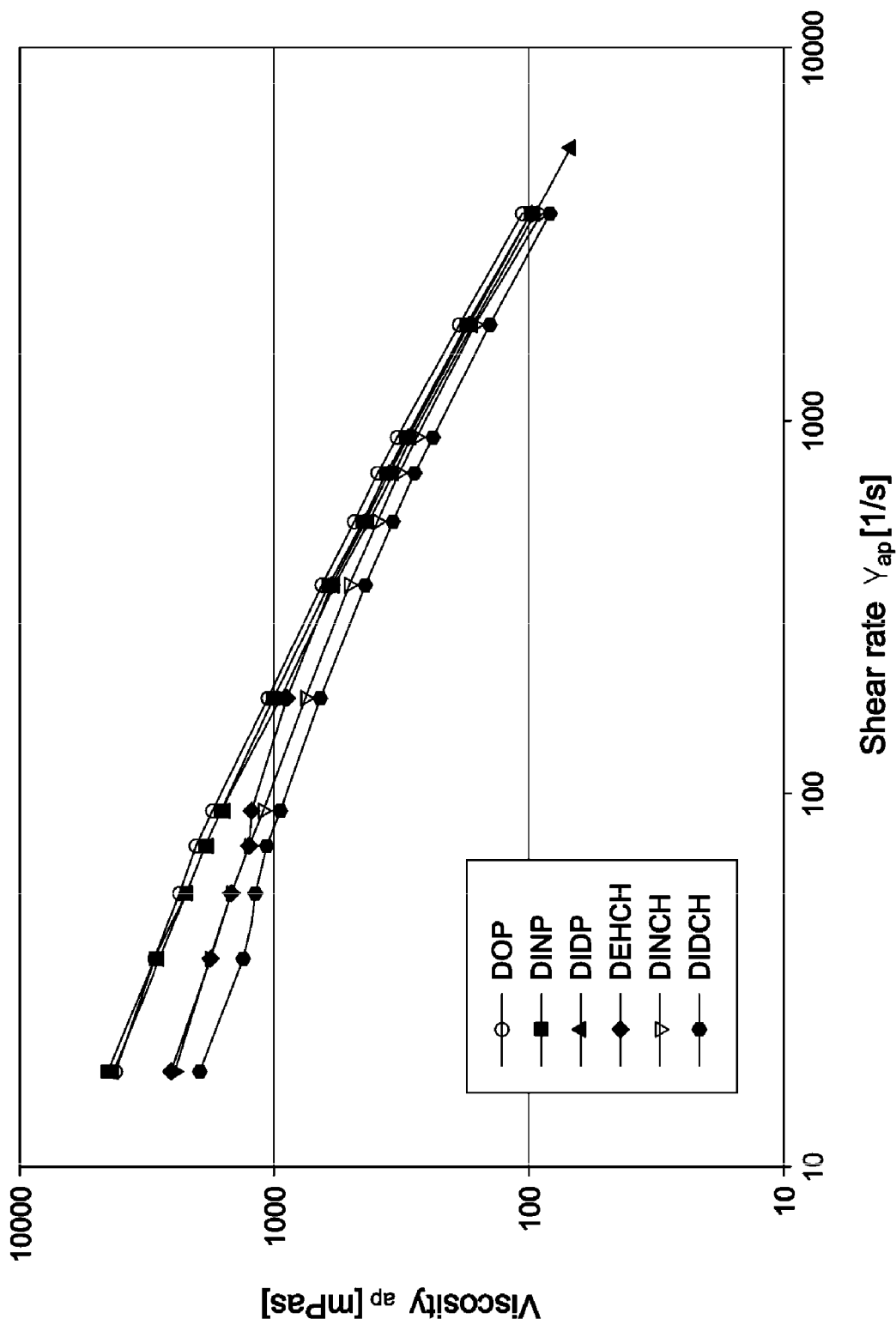
FIG. 4 plots melt viscosity versus shear rate.

The melt viscosities of the formulations were measured at 170° C. The results are shown in FIG. 4.

The formulations show a decreasing melt viscosity in the order: DOP>DEHCH>DINP>DIDP>DINCH>DIDCH showing the easier processability of the systems using the cyclohexanoic esters as plasticisers leading to a higher throughput in operations such as extrusion, callending, injection moulding and pelletising.

Figure 5:
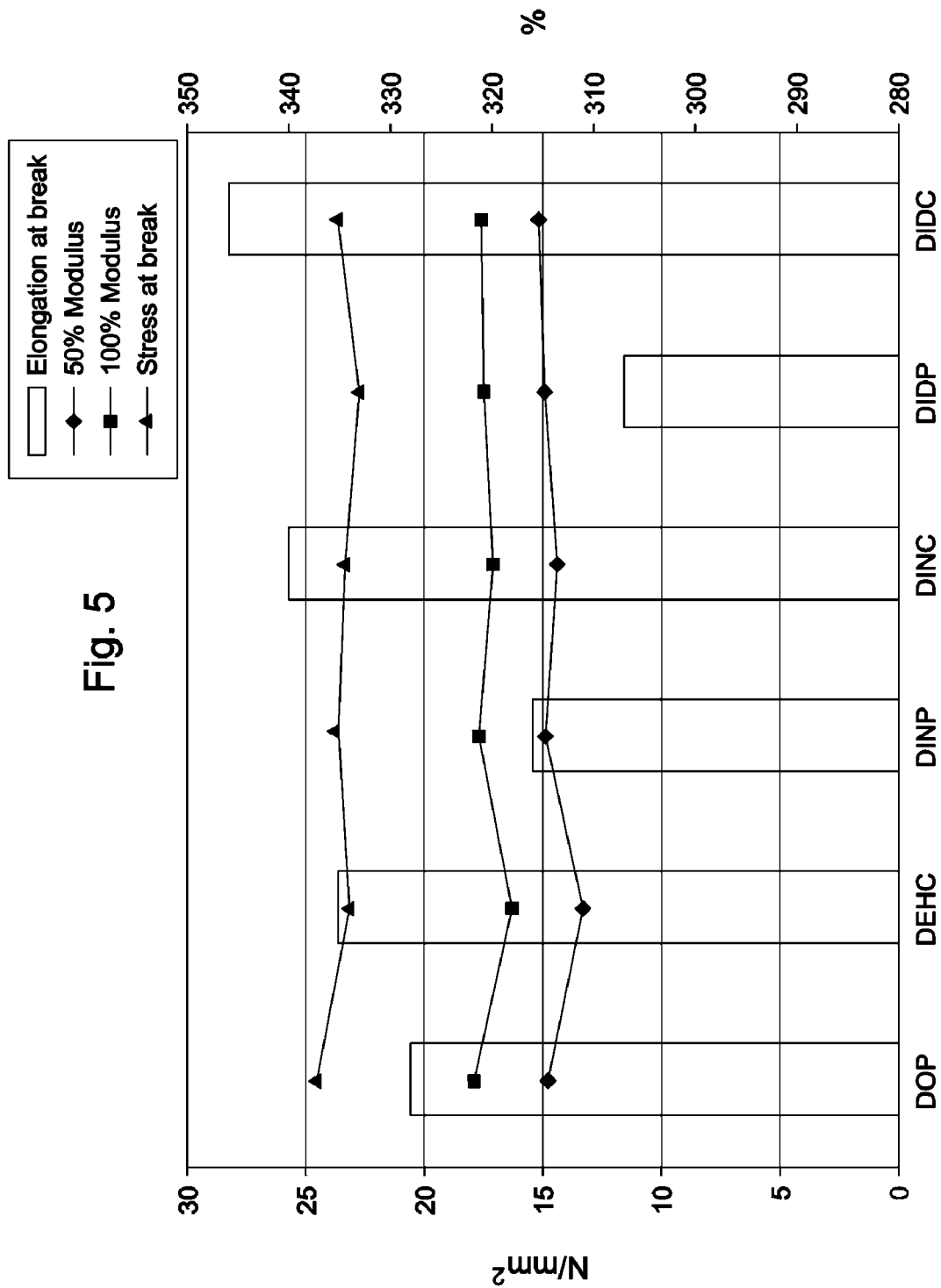
FIG. 5 plots mechanical properties of some foil and sheeting formulations.

The mechanical properties of these foil and sheeting formulations are shown in FIG. 5.

FIG. 5 shows that whereas by increasing the molecular weight of the phthalate (same level of plasticiser) the elongation at break is decreasing the opposite effect are achieved with the cyclohexanoic esters. The elongation at break of the cyclohexanoic ester formulation increases with increasing the molecular weight. The 100% modulus and the stress at break are slightly different using phthalates or cyclohexanoic esters and this difference is diminishing by increasing the molecular weight.

The Clash & Berg Temperatures (° C.) (ASTM D 1043-84) of these formulations were measured and found to be as set out in Table 10.

TABLE 10

| Alcohol | Phthalate | Cyclohexanoic ester |
| --- | --- | --- |
| $C_8$ | −6.0 | −9.0 |
| $C_9$ | −4.4 | −8.1 |
| $C_{10}$ | −4.9 | −7.7 |

The Clash & Berg temperature at the same level of plasticiser was therefore, on average, 3.3° C. lower for the cyclohexanoic esters than compared to the phthalates. This indicates improved cold flex performance for the cyclohexanoic ester based formulations.

The migration of the plasticisers from the sheets made from these formulations is measured by a test in which 5 centimeter diameter discs of the plasticised polyvinyl chloride were cut from 0.5 mm thick molded pads. Sandwiches were prepared from 2 discs containing different plasticisers. Three piles of five sandwiches were then placed in an oven held at 50° C. under a load of 5 kilograms.

Figure 6:
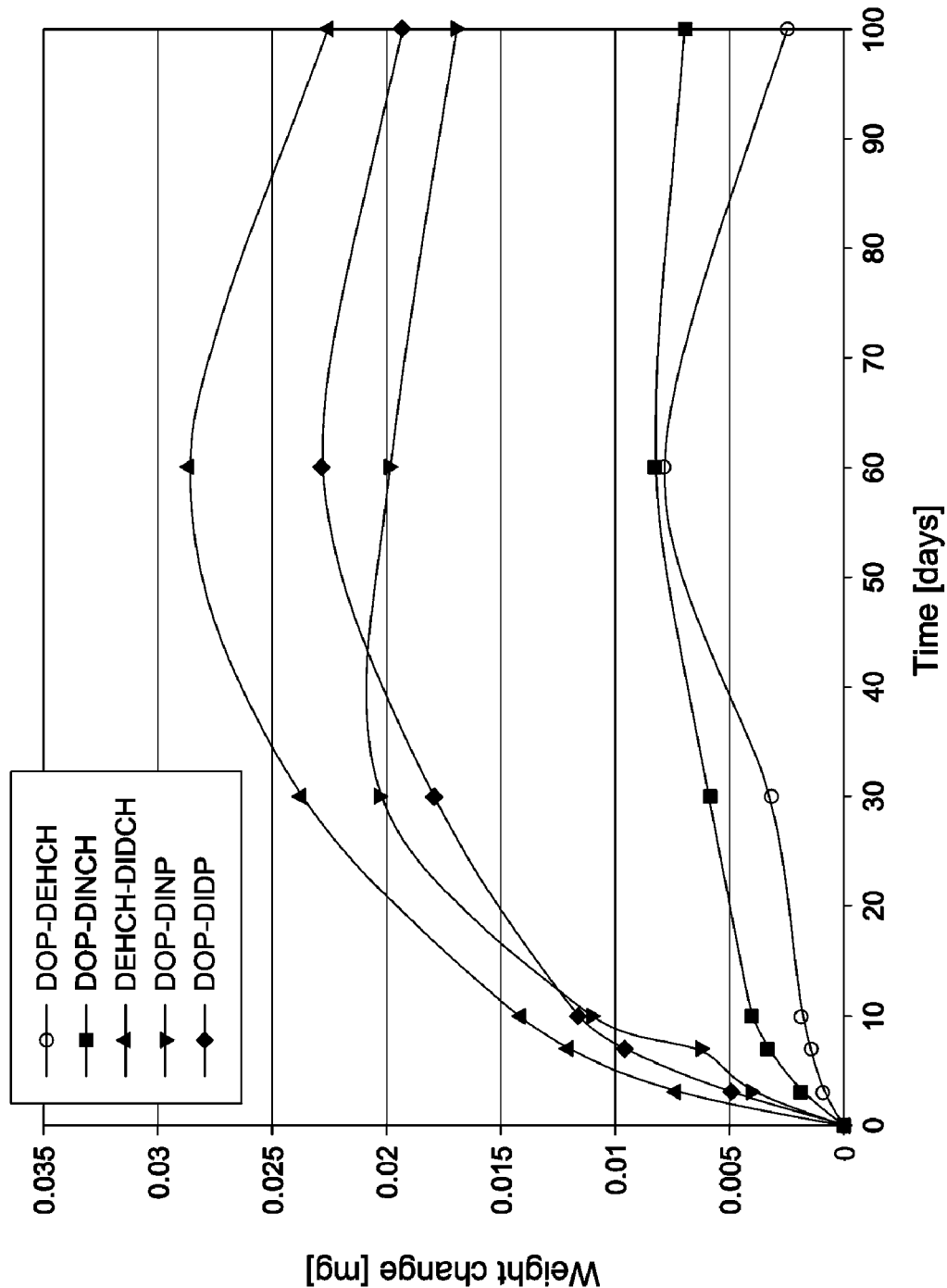
FIG. 6 plots weight change versus time.

The weight change in each disc was measured over several days and the average weight change for each sandwich calculated. The calculated average is the average of the weight changes of the two layers in the sandwich, a weight loss is taken as a positive number. The results are shown in FIG. 6. FIG. 6 shows that there is very limited migration between two discs, one of which is plasticised with DOP and the other plasticised with DEHCH. FIG. 6 also shows that the combination DOP-DINCH migrates two times slower than the DOP-DIDP. Therefore DEHCH and DINCH are a good substitute for DOP in all applications where migration between flexible PVC parts with different plasticiser plays a role and can also be used in structures in which one of the layers contains DOP.

The viscosity depressing effect of diisoheptyl cyclohexanoate was determined in formulations containing diisoheptyl phthalate (Jayflex 77) and also dodecyl benzene (DDB), the results are set out in Table 11.

TABLE 11

| PVC | | 100 | 100 | 100 | 100 | 100 | 100 |
| --- | --- | --- | --- | --- | --- | --- | --- |
| BBP | | 30 | — | — | — | — | — |
| Jayflex 77 | | — | 40 | 40 | 30 | 25 | — |
| DIHCH | | — | — | 8 | 10 | 15 | 20 |
| DOP | | 10 | — | — | — | — | — |
| Jayflex DINP | | — | — | — | — | — | 20 |
| Tinstab | | 1 | 1 | 1 | 1 | 1 | 1 |
| DDB | | 8 | 8 | — | — | — | — |
| Σ liquids | | 48 | 48 | 48 | 40 | 40 | 40 |
| Brookfield | 2 h | 7600 | 3400 | 5300 | 23250 | 19000 | 12500 |
| Viscosity | 4 h | 8300 | 3500 | 5550 | 23500 | 18750 | 12800 |
| [mPas] | 1 day | 11400 | 4450 | 7650 | 31500 | 25500 | 17250 |
| | 5 days | 14600 | 5600 | 10400 | 44500 | 37000 | 23500 |
| HBG [° C.] | | 58 | 66 | 59 | 59 | 60 | 66 |
| Volatility (pregelled) [wt %] * | | 1.87 | 1.56 | 0.96 | 0.97 | 0.97 | 0.92 |

* Pregelling: 20 sec at 160° C. airspeed: 1000 rpm; weight loss: 2 min at 180° C., airspeed 2300 rpm HBG is the hot gellation temperature.

The viscosity stability of formulations containing DIHCH as a viscosity depressant was also measured and found to be as set out in Table 12.

TABLE 12

| | | | | | | | |
|---|---|---|---|---|---|---|---|
| PVC | | 100 | 100 | 100 | 100 | 100 | 100 |
| Jayflex DINP | | 60 | 50 | 30 | — | 53 | 30 |
| DIHCH | | — | 10 | 30 | 60 | — | — |
| Jayflex 77 | | — | — | — | — | — | 30 |
| LZ 1364 | | 2 | 2 | 2 | 2 | 2 | 2 |
| DDB | | — | — | — | — | 7 | — |
| Brookfield | 2 h | 3550 | 2900 | 2200 | 1400 | 2150 | 2750 |
| viscosity | 4 h | 3600 | 2950 | 2300 | 1450 | 2200 | 2850 |
| [mPas] | 1 day | 3750 | 3050 | 2300 | 1600 | 2250 | 2950 |
| | 4 days | 3700 | 3050 | 2300 | 1650 | 2250 | 3000 |
| HBG [° C.]* | | 101 | 104 | 103 | 102 | 114 | 95 |
| Volatility [wt %]* | | 0.14 | 0.21 | 0.33 | 0.52 | 0.47 | 0.23 |

*Weight loss: 2 min at 180° C., airspeed 2300 rpm

Figure 7:
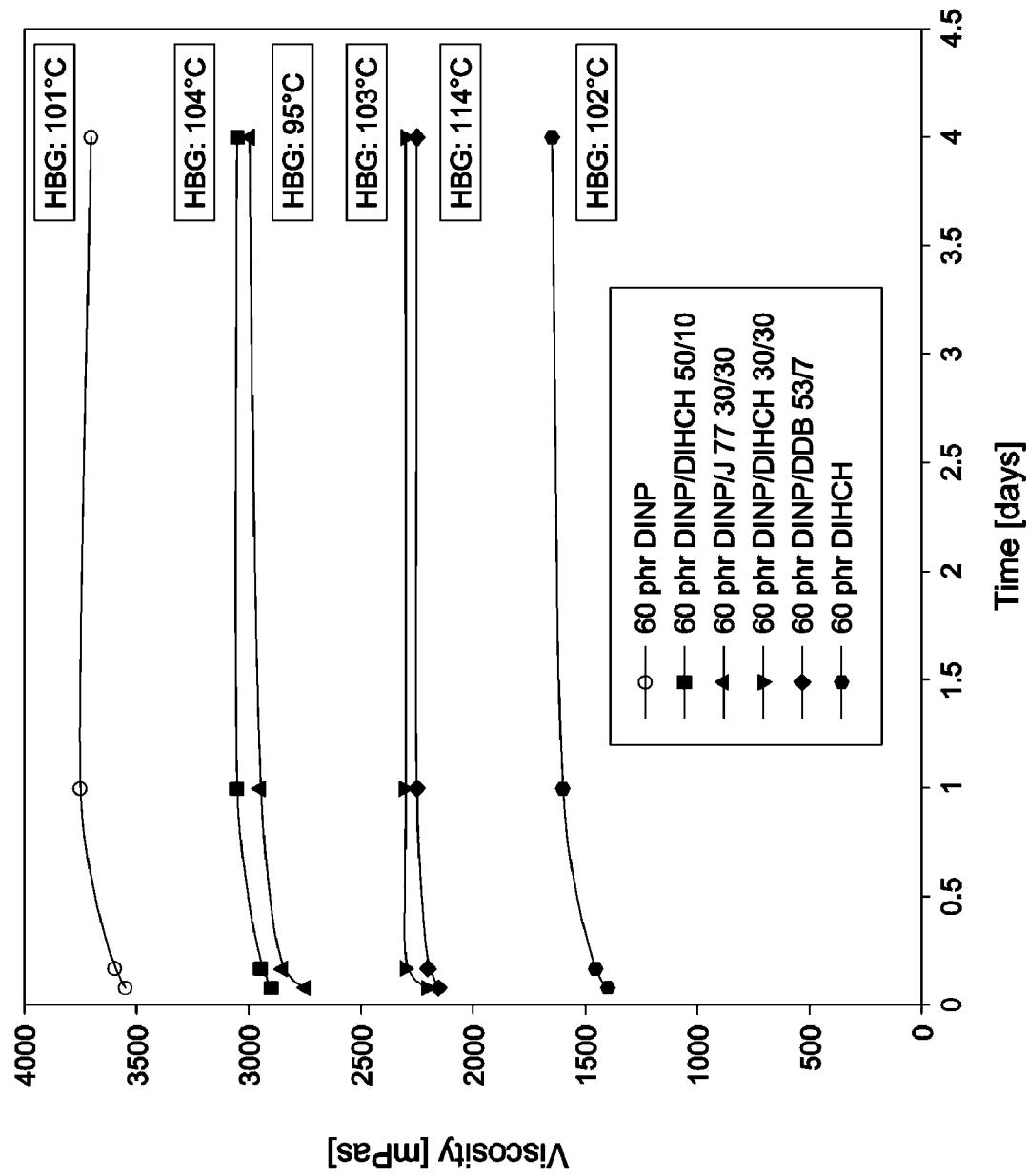
FIG. 7 plots viscosity change versus time.—

The results are illustrated graphically in FIG. 7.

The esters of cyclohexane carboxylic acids described herein are also useful in liquid systems and in particular as liquid solvents and processing acids.

In particular the esters of cyclohexane polycarboxylic acids such as 1,2-dicarboxylic acids, the 1,3-dicarboxylic acids or the 1,4-dicarboxylic acids. Alternatively they may be esters of the tricarboxylic acids such as 1,3,5, 1,2,3 and 1,2,4-tricarboxylic acids. Mixtures of these acids may also be used. Any alcohol may be used to esterify the acids although it is preferred to use alcohols containing from 5 to 20 carbon atoms, in particular alcohols containing from 6 to 12, more preferably 6 to 8, carbon atoms are preferred.

In one embodiment the esters previously described herein can be used as solvents in liquid formulations for the handling of agricultural chemical products because of their lower cost of manufacture and the ease of handling. Cyclohexane diesters of $C_2$ through $C_8$ alcohols are particularly useful in this application. These diesters will find application as primary solvents or co-solvents in low volume, ultra-low volume or emulsifiable concentrate formulations.

The use of the diesters increase the flexibility of the formulator of agricultural chemical pesticides because of their broad range of physical properties. The diesters have strong and unique solvency. They derive their strength from the polarity and hydrogen bonding of the esters while the cycloparaffinic ring provides a dispersive force. This means that the diesters will display affinities for active ingredients of many chemical types.

Volatility controls the residence time an active ingredient remains on the surface of a plant or insect. In the case of this family of diesters described herein, the evaporation rate and flash point can be controlled by the choice of the molecular weight of the ester through selection of the alcohol from which it is made. Many of these diesters will also meet low vapour pressure regulatory requirements.

The low pour point properties of these diesters will also allow their use as solvents in cold climates.

Many active ingredients are unstable or insoluble in water: the storage stability of active ingredients formulated into emulsifiable concentrates is dependent on low water solubilities. The diesters described herein also have the desirable low water solubility.

It is also expected that when these diesters are formulated and applied at realistic levels, they will pose minimal phytotoxic risk.

In another embodiment the esters of cyclohexane carboxylic acids described herein are used as solvents in carbonless copy paper (CCP) which is made using a micro-encapsulation process. A CCP set consists of three sheets of paper, one original and two copies. The top sheet (original) has a plane front and is coated with microcapsules on the back. The middle sheet ($1^{st}$ copy) is coated with a developer on the front and microcapsules on the back. The bottom sheet ($2^{nd}$ copy) is coated with a developer on the front and is plain on the back. The microcapsules contain colourformers, 'dyes', that change colour when they come in contact with the developer. Solvents are used as carriers for the colourformers. Prime solvents are used to dissolve the colourformers and diluent solvents are used to reduce solution viscosity. When the microcapsules are broken (pen, printer head etc), the encapsulated colourformer solution comes in contact with the developer, forming an image.

Cyclohexanoic acid diesters, particular the diesters of $C_2$ through $C_6$ alcohols, are good candidates for prime solvents in CCP. These diesters have the high solvency power needed to dissolve colourformers sufficiently and are compatible with currently marketed diluent solvents. These diesters have the general requirements for prime and diluent solvents: high purity, low odour, light stability and the appropriate molecular weight to dry by absorption.

The diesters are compatible with the various compositions of the microcapsules, typically polyamide, polyurethane, polyvinyl alcohol or acrylic. The diesters are also compatible with the developer layer, typically clay or phenolic resins.

In a further embodiment the esters are of cyclohexane carboxylic acids described herein also useful as solvents for printing inks generally contain pigments for coloration, resins to form the ink film, additives to impart special properties and solvents for viscosity control and to carry the ingredients to the substrate.

The resins used in the inks are solids or semi-solid organic substances which bind the pigments to the printed surface. An ink varnish or vehicle is made by dissolving resin and additives in solvent. A pigment flush is pre-dispersed pigment in resin, solvent and additives. A finished ink typically contains varnish, pigment flush and additional solvent and additives.

Paraffin hydrocarbon solvents are commonly used to make a varnish for a paste ink. Examples would be Exx-Print® 283 D and Exx-Print® 588 D fluids. Co-solvents (TXIB, Exxal® 13) are often added to the varnish to improve resin-solvent compatibility, reduce tack or adjust viscosity. Co-solvents are also added to the pigment flush to provide improved solvency or reduce viscosity. Co-solvents may also be added to the finished ink to adjust viscosity or dissolve additives.

Cyclohexanoic acid diesters, particularly esters of $C_2$ through $C_6$ alcohols, are useful as co-solvents in printing ink formulations. The structure and molecular weight of these diesters provides the necessary solvency strength and appropriate evaporation profiles to displace competitive products like TXIB, etc.

The esters are also useful as LVP fluids are specific Volatile Organic Compounds (VOC) with Low Vapour Pressure (LVP) that meet the LVP-VOC exemption criteria established in California's Consumer Products Regulation and in the USEPA National Volatile Organic Compound Emission Standards for Consumer Products.

Cyclohexanoic acid diesters of $C_2$ through $C_6$ alcohols meet the vapour pressure criterion specified in both the federal and state consumer product regulations. These diesters will be excellent performers in product categories where the use of an organic LVP solvent or carrier is needed to meet performance requirements. Recommended applications for LVP diesters in consumer products include household products, automotive chemicals, insecticides and personal care products. A complete list of all products (divided into 24 product categories) can be obtained from CARB and/or the EPA. These diesters can be formulated into all of the listed products.

An example would be the replacement of d-limonene. D-limonene is promoted as a 'natural' carrier in consumer products. Manufactures of consumer products are concerned with d-limonene's supply insecurity, inconsistent quality and high cost. The cyclohexanoic acid diesters provide performance and environmental benefits over products like d-limonene: consistent product quality, higher flash points, non-reportable VOC status, higher level of biodegradability and stronger solvency for better cleaning power.

The diesters can be used neat or in emulsions as desired. The diesters are compatible with typical materials selected for packaging and aerosol valving systems. They are also compatible with commonly used aerosol propellants.

The esters of cyclohexanoic carboxylic acid described herein may also be used as coalescers in latex coatings. There are a variety of polymers used in waterborne coatings today. The most common polymers are acrylic polymers, polyvinyl acetate ethylene, vinyl acetate copolymers and polymers of and vinyl ester. Most waterborne formulations require small amounts of organic solvents to aid in the coalescence of the polymer particles. Cyclohexanoic acid diesters of $C_2$ thorough $C_6$ alcohols are useful as coalescing aids. These diesters possess a number of unique properties which are often difficult to find in a single solvent: (1) limited water miscibility, (2) hydrolytic stability, (3) proper evaporation rates and (4) strong solvency to coalescence the polymer particles.

Glycol ethers are currently used as coalescers (DM, DE, DP, DB, PPH etc). These are entirely or partially soluble in water, which has a negative effect on coalescing power and leads to poor hydrolytic stability. Due to their low water solubilities, the cyclohexane diesters will partition into the polymer phase, exhibiting excellent coalescing power. Due to water immiscibility and steric hindrance, the diesters exhibit good hydrolytic stability.

Important in the formulation of a waterborne coating is the evaporation rate of the water/solvent mixture. As the coating dries, it is desirable that the water and solvent evaporate at rates such that the concentration of solvent increases over time. Depletion of the solvent prior to the water leads to poor coalescence. The evaporation rates of the diesters may be controlled by selection of molecular weight to provide the flexibility to formulate efficiently and balance the impact of varying humidity levels.

The ester structure coupled with the cyclohexanoic ring provides coalescing power, the stability to fuse polymer particulars to form a smooth continuous film at low temperatures. The diesters should show excellent film forming behaviour across the range of latex polymers.

The odor of the coalescer in an interior coating is important. The diesters have little odour.

The esters described herein may also be used as plasticisers in mastics and sealants which seal off to provide a flexible joint between different materials to exclude dust, dirt, moisture or chemicals and to reduce noise, vibration and to insulate or to serve as space fillers. An increasing amount of sealant and mastics are produced on the basis of polyurethane, acrylics or polysulphides. The majority of these products are containing plasticiser in the range of 1 to 30%.

In addition to the plasticising effect, the esters of cyclohexanoic carboxylic acids also serve as a viscosity modifier, a wetting agent for the filler and any substrate where the mastic and sealant is applied. Another advantage of the cyclohexanoates is the lower viscosity compared to the currently used phthalates or alkyl sulphonic esters of phenol. This eases the processing of the sealant and mastics.

Examples of the components used in such mastic and sealant compositions include:

Silicones:
(Pre)polymer, crosslinking agent, non-reactive plasticiser, active fillers (carbon black, fumed silica), filler ($CaCO_3$), pigment, drying agent, adhesion promoter.

Polyurethanes:
Polymer system (either 2 separate components, to be reacted in-situ or 1-C 'Pre-polymer'), plasticiser, drying agent (molecular sieve, CaO, Portland cement), active filler (fumed silica, carbon black), filler ($CaCO_3$), miscellaneous (pigments, antioxidants, UV-stabiliser, adhesion promoters).

Polysulphides:
Polymer system, plasticiser, active filler (carbon black, fumed silica), $CaCO_3$, miscellaneous (adhesion promoter, pigments), oxidants (for 2-C: $PbO_2$, $MnO_2$, for 1-C: CaO, initiated by moisture).

Polyacrylates:
Polymer (reacted), plasticiser, solvent, filler ($CaCO_3$) miscellaneous additives.

Butyl/PIB Sealant:
Polymer, plasticiser, filler (active and inactive), antioxidants, curing agents, solvents.

It is expected that cyclohexanoates are showing an improved performance in terms of weathering and cold flexibility of the final product versus the currently used plasticisers in these mastics and sealant applications.

In a further embodiment the esters of cyclohexanoic acids described herein are used as polymerisation media particularly for the products of acrylic coating applications where it is desirable to utilise resins having low molecular weight and narrow molecular weight distribution in order to achieve workable spray viscosities. To reduce molecular/weights, higher polymerisation temperatures are often required. Since high solids acrylic resin polymerisations are typically conducted at the reflux temperature of the polymerisation media, the choice of the media is based on its boiling point, chain transfer characteristics and solvency.

Cyclohexanoic di-esters particularly those of $C_2$ through $C_6$ alcohols considerably expand the base of materials which can be used as polymerisation media. These diesters will find application as primary solvents or cosolvents in acrylic polymerisations. The higher boiling ranges will produce lower, unique molecular weights and narrow molecular weight distributions, reducing solution viscosities.

Acrylic polymers made in these di-esters will have the added benefit of high electrical resistance for good electrostatic spray performance.

The diesters of cyclohexanoic acid described herein will have unique, higher chain transfer coefficients when used as polymerisation medium. Chain transfer describes the ability of polymerisation media to limit the molecular weight of a growing polymer by removing the free-radical growth alia from the molecule and using it to initiate a new chain.

The esters described herein may also be used as plasticisers in water based adhesives. They can control application characterises such as viscosity or open time. Additional they modify the physical properties of the polymer to yield more flexible adhesives capable of performing at lower temperatures.

An example of a latex adhesive composition is as follows:

| Base emulsion Plasticiser | Homopolymer, copolymer |
|---|---|
| Solvents | Aromatic, Ketones |
| Polyvinylalcohol | Partially or fully hydrolysed |
| Wetting Agents | Nonionics, anionics |
| Humectants | Diethylene glycol, glycerin |
| Tackifiers | Extenders, rosin ester, phenolics |
| Thickeners | Cellulosics, starches |
| Defoamers | Silicones |
| Biocides | Sodium benzoate, phenol |

The average usage level of plasticisers in homopolymers is around 18% and about 9% in copolymers based on the total solids content of the emulsion.

We claim:

1. A composition comprising the product of;
   (a) a polyvinyl chloride material; and
   (b) a blend comprising a cyclohexane dicarboxylic acid ester or a mixture of cyclohexane dicarboxylic acid esters and at least one other plasticiser;
   wherein the composition comprises from 20 to 200 parts of the cyclohexane dicarboxylic acid ester and the at least one other plasticiser, per 100 parts of the polyvinyl chloride material (parts being by weight); and
   wherein the blend comprises from 90 wt % to 10 wt % of the cyclohexane dicarboxylic acid ester or the mixture of cyclohexane dicarboxylic acid esters and from 10 wt % to 90 wt % of the at least one other plasticiser, based upon the total weight of the plasticiser present.

2. The composition of claim 1, wherein the cyclohexane dicarboxylic acid ester is or the mixture comprises $C_{5-7}$, $C_{8-9}$, $C_{8-10}$, $C_9$, $C_{10}$, $C_{7-11}$, $C_{9-11}$ and $C_{7-9}$ esters of 1,2-cyclohexane dicarboxylic acid.

3. The composition of claim 1, wherein the cyclohexane dicarboxylic acid ester is selected from the group consisting of or the mixture comprises at least one of 1,2-cyclohexane dicarboxylic acid diisobutyl, 1,2-cyclohexane dicarboxylic acid dicyclohexyl, 1,2-cyclohexane dicarboxylic acid diiso heptyl, 1,2-cyclohexane dicarboxylic acid di (3,5,5-trimethyl hexyl), 1,2-cyclohexane dicarboxylic acid di (2,6-di methyl-4-heptyl), 1,2-cyclohexane dicarboxylic acid diisodecyl, 1,2-cyclohexane dicarboxylic acid diisoundecyl, 1,2-cyclohexane dicarboxylic acid diiso tridecyl, 1,2-cyclohexane dicarboxylic acid di isononyl, 1,2-cyclohexane dicarboxylic acid di-2-ethylhexyl, 1,2-cyclohexane dicarboxylic acid di-2-propyl heptyl, 1,2-cyclohexane dicarboxylic acid diiso octadecyl, diiso octadecyl, 3-methyl-1,2-cyclohexane dicarboxylic acid diisobutyl, 3-methyl-1,2-cyclohexane dicarboxylic acid dicyclohexyl, 3-methyl-1,2-cyclohexane dicarboxylic acid diiso heptyl, 3-methyl-1,2-cyclohexane dicarboxylic acid di (2-ethylhexyl), 3-methyl-1,2-cyclohexane dicarboxylic acid di (3,5,5-trimethyl hexyl), 3-methyl-1,2-cyclohexane dicarboxylic acid di (2,6-di methyl-4-heptyl), 3-methyl-1,2-cyclohexane dicarboxylic acid diisodecyl, 3-methyl-1,2-cyclohexane dicarboxylic acid di isononyl, 3-methyl-1,2-cyclohexane dicarboxylic acid di-2-ethylhexyl, 3-methyl-1,2-cyclohexane dicarboxylic acid di-2-propyl heptyl, 3-methyl-1,2-cyclohexane dicarboxylic acid diisoundecyl, 3-methyl-1,2-cyclohexane dicarboxylic acid diiso tridecyl, 3-methyl-1,2-cyclohexane dicarboxylic acid diiso octadecyl, 4-methyl-1,2-cyclohexane dicarboxylic acid diisobutyl, 4-methyl-1,2-cyclohexane dicarboxylic acid dicyclohexyl, 4-methyl-1,2-cyclohexane dicarboxylic acid diiso heptyl, 4-methyl-1,2-cyclohexane dicarboxylic acid di (3,5,5-trimethyl hexyl), 4-methyl-1,2-cyclohexane dicarboxylic acid di (2,6-di methyl-4-heptyl), 4-methyl-1,2-cyclohexane dicarboxylic acid diisodecyl, 4-methyl-1,2-cyclohexane dicarboxylic acid diisoundecyl, 4-methyl-1,2-cyclohexane dicarboxylic acid diiso tridecyl, and 4-methyl-1,2-cyclohexane dicarboxylic acid diiso octadecyl.

4. The composition of claim 1, wherein the cyclohexane dicarboxylic acid ester is selected from the group consisting of or the mixture comprises at least one of 1,2-cyclohexane dicarboxylic acid di heptyl, 1,2-cyclohexane dicarboxylic acid dioctyl, 1,2-cyclohexane dicarboxylic acid di decyl, 1,2-cyclohexane dicarboxylic acid di undecyl, 1,2-cyclohexane dicarboxylic acid di dodecyl, 1,2-cyclohexane dicarboxylic acid di tetradecyl, 1,2-cyclohexane dicarboxylic acid dihexadecyl, 1,2-cyclohexane dicarboxylic acid dioctadecyl, 3-methyl-1,2-cyclohexane dicarboxylic acid di heptyl, 3-methyl-1,2-cyclohexane dicarboxylic acid dioctyl, 3-methyl-1,2-cyclohexane dicarboxylic acid di decyl, 3-methyl-1,2-cyclohexane dicarboxylic acid di undecyl, 3-methyl-1,2-cyclohexane dicarboxylic acid di dodecyl, 3-methyl-1,2-cyclohexane dicarboxylic acid di tetradecyl, 3-methyl-1,2-cyclohexane dicarboxylic acid dihexadecyl, 3-methyl-1,2-cyclohexane dicarboxylic acid dioctadecyl, 4-methyl-1,2-cyclohexane dicarboxylic acid di heptyl, 4-methyl-1,2-cyclohexane dicarboxylic acid dioctyl, 4-methyl-1,2-cyclohexane dicarboxylic acid di decyl, 4-methyl-1,2-cyclohexane dicarboxylic acid di undecyl, 4-methyl-1,2-cyclohexane dicarboxylic acid di dodecyl, 4-methyl-1,2-cyclohexane dicarboxylic acid di tetradecyl, 4-methyl-1,2-cyclohexane dicarboxylic acid dihexadecyl, and 4-methyl-1,2-cyclohexane dicarboxylic acid dioctadecyl.

5. The composition of claim 1, wherein the cyclohexane dicarboxylic acid ester is selected from the group consisting of or the mixture comprises at least one of cyclohexane-1,2-dicarboxylic acid di(isopentyl) ester, obtainable by hydrogenation of a di(isopentyl)phthalate having the Chemical Abstracts registry number (in the following: CAS No.) 84777-06-0; cyclohexane-1,2-dicarboxylic acid di(isoheptyl) ester, obtainable by hydrogenating the di(isoheptyl)phthalate having the CAS No. 71888-89-6; cyclohexane-1,2-dicarboxylic acid di(isononyl) ester, obtainable by hydrogenating the di(isononyl)phthalate having the CAS No. 68515-48-0; cyclohexane-1,2-dicarboxylic acid di(isononyl) ester, obtainable by hydrogenating the di(isononyl)phthalate having the CAS No. 28553-12-0, which is based on n-butene; cyclohexane-1,2-dicarboxylic acid di(isononyl) ester, obtainable by hydrogenating the di(isononyl)phthalate having the CAS No. 28553-12-0, which is based on isobutene; a 1,2-di-C9-ester of cyclohexane dicarboxylic acid, obtainable by hydrogenating the di(nonyl)phthalate having the CAS No. 68515-46-8; cyclohexane-1,2-dicarboxylic acid di(isodecyl) ester, obtainable by hydrogenating a di(isodecyl)phthalate having the CAS No. 68515-49-1; 1,2-C7-11-ester of cyclohexane dicarboxylic acid, obtainable by hydrogenating the corresponding phthalic acid ester having the CAS No. 68515-

42-4; 1,2-di-C7-11-ester of cyclohexane dicarboxylic acid, obtainable by hydrogenating the di-$C_7$-11-phthalates having the following CAS Nos.: 111381-89-6, 111381-90-9, 111381-91-0, 68515-44-6, 68515-45-7 and 3648-20-7; a 1,2-di-C9-11-ester of cyclohexane dicarboxylic acid, obtainable by hydrogenating a di-C9-11-phthalate having the CAS No. 98515-43-5; a 1,2-di(isodecyl)cyclohexane dicarboxylic acid ester, obtainable by hydrogenating a di(isodecyl)phthalate, consisting essentially of di-(2-propylheptyl)phthalate; 1,2-di-C7-9-cyclohexane dicarboxylic acid ester, obtainable by hydrogenating the corresponding phthalic acid ester, which comprises branched and linear C7-9-alkylester groups; respective phthalic acid esters which may be used as starting materials have the following CAS Nos.: di-C7-9-alkylphthalate having the CAS No. 111 381-89-6; di-C7-alkylphthalate having the CAS No. 68515-44-6; and di-C9-alkylphthalate having the CAS No. 68515-45-7.

6. The composition of claim 1, wherein the mixture comprises diesters made from cyclohexanoic dicarboxylic acid and a mixture of alcohols having an average carbon number between 8.5 and 9.5.

7. The composition of claim 1, wherein the blend comprises from 30 to 60 wt % of the cyclohexane dicarboxylic acid ester or the mixture of cyclohexane dicarboxylic acid esters, based upon the total weight of the plasticiser present.

8. The composition of claim 1, wherein the at least one other plasticiser is selected from the group consisting of at least one of adipate esters, citrate esters, phthalate esters, trimellitate esters, and polymeric esters.

9. The composition of claim 1, wherein the at least one other plasticiser is selected from trimellitate esters.

10. The composition of claim 1, wherein the at least one other plasticiser is selected from the group consisting of at least one of monomethyl terephthalate, dimethyl terephthalate, diethyl terephthalate, di-n-propyl terephthalate, di-n-butyl terephthalate, di-tert-butyl terephthalate, diisobutyl terephthalate, monoglycol esters of terephthalic acid, diglycol esters of terephthalic acid, di-n-octyl terephthalate, diisooctyl terephthalate, mono-2-ethylhexyl terephthalate, di-2-ethylhexyl terephthalate, di-n-nonyl terephthalate, diisononyl terephthalate, di-n-decyl terephthalate, di-n-undecyl terephthalate, diisodecyl terephthalate, diisododecyl terephthalate, di-n-octadecyl terephthalate, diisooctadecyl terephthalate, di-n-eicosyl terephthalate, monocyclohexyl terephthalate, and dicyclohexyl terephthalate.

11. The composition of claim 1, wherein the at least one other plasticiser is selected from the group consisting of at least one of monomethyl phthalate, dimethyl phthalate, diethyl phthalate, di-n-propyl phthalate, di-n-butyl phthalate, di-tert-butyl phthalate, diisobutyl phthalate, monoglycol esters of phthalic acid, diglycol esters of phthalic acid, di-n-octyl phthalate, diisooctyl phthalate, di-2-ethylhexyl phthalate, di-n-nonyl phthalate, diisononyl phthalate, di-n-decyl phthalate, diisodecyl phthalate, di-n-undecyl phthalate, diisododecyl phthalate, di-n-octadecyl phthalate, diisooctadecyl phthalate, di-n-eicosyl phthalate, monocyclohexyl phthalate, dicyclohexyl phthalate; alkyl isophthalates such as monomethyl isophthalate, dimethyl isophthalate, diethyl isophthalate, di-n-propyl isophthalate, di-n-butyl isophthalate, di-tert-butyl isophthalate, diisobutyl isophthalate, monoglycol esters of isophthalic acid, diglycol esters of isophthalic acid, di-n-octyl isophthalate, diisooctyl isophthalate, di-2-ethylhexyl isophthalate, di-n-nonyl isophthalate, diisononyl isophthalate, di-n-decyl isophthalate, diisodecyl isophthalate, di-n-undecyl isophthalate, diisododecyl isophthalate, di-n-octadecyl isophthalate, diisooctadecyl isophthalate, di-n-eicosyl isophthalate, monocyclohexyl isophthalate, and dicyclohexyl isophthalate.

12. The composition of claim 1, wherein the at least one other plasticiser is selected from the group consisting of at least one of di-(2-ethylhexyl) adipate and diisononyl adipate.

13. The composition of claim 1, wherein the at least one other plasticiser is selected from the group consisting of at least one of diethylene glycol dibenzoate, butyl benzyl phthalate, dipropylene glycol dibenzoate, phenyl cresyl esters of pentadecyl sulfonic aromatic sulfonic acid esters, tributylacetyl citrate, tri-2-ethylhexyl phosphate, trioctyl phosphate, 2-ethylhexyl-isodecyl phosphate, di-2-ethylhexyl phenyl phosphate, triphenyl phosphate, and tricresyl phosphate.

14. The composition of claim 1, wherein the composition comprises from 40 to 180 parts of the cyclohexane dicarboxylic acid ester and the at least one other plasticiser, per 100 parts of the polyvinyl chloride material (parts being by weight).

15. The composition of claim 1, wherein the composition comprises from 70 to 120 parts of the cyclohexane dicarboxylic acid ester and the at least one other plasticiser, per 100 parts of the polyvinyl chloride material (parts being by weight).

16. The composition of claim 1, wherein the blend comprises at least 35% of the cyclohexane dicarboxylic acid ester or the mixture of cyclohexane dicarboxylic acid esters, based upon the total weight of the plasticiser present.

17. The composition of claim 1, wherein the composition further comprises at least one of a stabiliser, a filler, a lubricant, and a processing aid.

18. The composition of claim 1, wherein the polyvinyl chloride material has a K value in the range of from 65 to 75.

19. The composition of claim 1, wherein the polyvinyl chloride material has a K value in the range of from 65 to 70.

20. The composition of claim 1, wherein the composition is a dry blend.

21. An article made from the composition of claim 1, wherein the article is selected from the group consisting of coverings, window shades, films, sheetings, upholstery, synthetic leather, shoe soles, shoes, materials used for food contact, adhesive tapes, shoe and automobile interiors, stationary, wires, and cables.

* * * * *